(12) United States Patent
Lenox

(10) Patent No.: US 9,563,365 B2
(45) Date of Patent: Feb. 7, 2017

(54) SYSTEM AND METHOD FOR USING A MEMORY BUFFER TO STREAM DATA FROM A TAPE TO MULTIPLE CLIENTS

(75) Inventor: Michael Eric Lenox, Huntsville, AL (US)

(73) Assignee: KIP CR P1 LP, New York, NY (US)

( * ) Notice: Subject to any disclaimer, the term of this patent is extended or adjusted under 35 U.S.C. 154(b) by 1003 days.

(21) Appl. No.: 13/459,531

(22) Filed: Apr. 30, 2012

(65) Prior Publication Data
US 2013/0290388 A1    Oct. 31, 2013

(51) Int. Cl.
    *G06F 17/30*    (2006.01)
    *G06F 3/06*    (2006.01)

(52) U.S. Cl.
    CPC ........... *G06F 3/0611* (2013.01); *G06F 3/0656* (2013.01); *G06F 3/0686* (2013.01); *G06F 17/30144* (2013.01); *G06F 17/30212* (2013.01); *G06F 2212/224* (2013.01); *G06F 2212/282* (2013.01); *G06F 2212/312* (2013.01)

(58) Field of Classification Search
    CPC ................ G06F 17/30; G06F 17/30212; G06F 17/30144
    See application file for complete search history.

(56) References Cited

U.S. PATENT DOCUMENTS

| 5,403,639 | A | 4/1995 | Belsan |
| 5,488,702 | A | 1/1996 | Byers |
| 5,740,430 | A | 4/1998 | Rosenberg et al. |
| 5,829,038 | A * | 10/1998 | Merrell ............... G06F 12/0811 711/122 |
| 5,829,046 | A | 10/1998 | Tzelnic et al. |
| 6,023,709 | A | 2/2000 | Anglin et al. |
| 6,029,179 | A | 2/2000 | Kishi |
| 6,085,234 | A | 7/2000 | Pitts |
| 6,463,513 | B1 | 10/2002 | Bish et al. |
| 6,502,165 | B1 | 12/2002 | Kishi |
| 6,549,992 | B1 * | 4/2003 | Armangau et al. .......... 711/162 |
| 7,139,791 | B1 * | 11/2006 | Coleman ...................... 709/203 |
| 7,266,556 | B1 | 9/2007 | Coates |
| 7,681,069 | B1 | 3/2010 | Chellappa et al. |
| 7,752,384 | B2 | 7/2010 | Moody et al. |
| 7,941,597 | B2 | 5/2011 | Moody et al. |
| 8,131,924 | B1 | 3/2012 | Frandzel et al. |
| 8,285,758 | B1 | 10/2012 | Bono et al. |
| 8,453,010 | B2 | 5/2013 | Thompson et al. |
| 8,527,561 | B1 | 9/2013 | Moody, II et al. |

(Continued)

FOREIGN PATENT DOCUMENTS

WO    WO 00/43889 A1    7/2000

OTHER PUBLICATIONS

Pease, David, et al., "The Linear Tape File System," IBM Yamato Lab, 2010, 8 pages, #978-1-4244-7153-9/10, IEEE, U.S.

(Continued)

*Primary Examiner* — Charles Rones
*Assistant Examiner* — Tian-Pong Chang
(74) *Attorney, Agent, or Firm* — Sprinkle IP Law Group

(57) ABSTRACT

Embodiments described herein provide systems and methods for streaming data to multiple reading clients. More particularly, embodiments described herein provide systems and methods for using a memory buffer to stream file data from a mounted tape file system volume to multiple reading clients.

21 Claims, 26 Drawing Sheets

(56) References Cited

U.S. PATENT DOCUMENTS

| | | | |
|---|---|---|---|
| 8,566,517 | B1 | 10/2013 | Sims et al. |
| 8,675,296 | B2 | 3/2014 | Amir et al. |
| 8,832,365 | B1 | 9/2014 | Sims et al. |
| 8,935,431 | B2 | 1/2015 | Oehme et al. |
| 8,977,827 | B1 | 3/2015 | Sims et al. |
| 9,323,776 | B2 | 4/2016 | Sims et al. |
| 2002/0087783 | A1* | 7/2002 | Leonhardt et al. ........... 711/111 |
| 2002/0095537 | A1 | 7/2002 | Slater |
| 2003/0084368 | A1 | 5/2003 | Sprunt |
| 2003/0135783 | A1 | 7/2003 | Martin et al. |
| 2004/0111485 | A1 | 6/2004 | Mimatsu et al. |
| 2004/0267822 | A1 | 12/2004 | Curran et al. |
| 2005/0188246 | A1 | 8/2005 | Emberty et al. |
| 2006/0126209 | A1 | 6/2006 | Starr et al. |
| 2007/0067364 | A1 | 3/2007 | Barbian et al. |
| 2007/0189708 | A1 | 8/2007 | Lerman et al. |
| 2007/0239806 | A1* | 10/2007 | Glover ................ G06F 11/1435 |
| 2008/0015734 | A1 | 1/2008 | Wideman et al. |
| 2008/0077739 | A1 | 3/2008 | Tashiro |
| 2008/0208927 | A1 | 8/2008 | Chikusa |
| 2009/0006543 | A1 | 1/2009 | Smit |
| 2009/0009818 | A1* | 1/2009 | Mita et al. ................... 358/434 |
| 2009/0164714 | A1 | 6/2009 | Wideman et al. |
| 2009/0171886 | A1* | 7/2009 | Wu et al. .......................... 707/2 |
| 2009/0177836 | A1 | 7/2009 | Mimatsu |
| 2009/0213482 | A1 | 8/2009 | Fujihara |
| 2010/0103549 | A1 | 4/2010 | Murayama et al. |
| 2010/0182887 | A1 | 7/2010 | Moody |
| 2011/0184909 | A1 | 7/2011 | Slater et al. |
| 2011/0196899 | A1 | 8/2011 | Hughes et al. |
| 2012/0011336 | A1 | 1/2012 | Saika |
| 2012/0054428 | A1 | 3/2012 | Butt et al. |
| 2012/0158882 | A1 | 6/2012 | Oehme et al. |
| 2012/0179867 | A1* | 7/2012 | Chakravarty et al. ........ 711/111 |
| 2012/0323934 | A1 | 12/2012 | Amir et al. |
| 2013/0132663 | A1 | 5/2013 | Eleftheriou et al. |
| 2013/0173548 | A1 | 7/2013 | Haustein et al. |
| 2013/0311527 | A1 | 11/2013 | Moody, II et al. |
| 2014/0164693 | A1 | 6/2014 | Hasegawa et al. |
| 2014/0172930 | A1 | 6/2014 | Molaro et al. |
| 2014/0337571 | A1 | 11/2014 | Sims et al. |
| 2015/0161010 | A1 | 6/2015 | Sims et al. |
| 2016/0203160 | A1 | 7/2016 | Sims et al. |

OTHER PUBLICATIONS

Linear Tape File System (LTFS) Format Specification, LTFS Format Version 2.0.0., Mar. 11, 2011, 69 pages, accessed on Sep. 29, 2011 at http://www.trustito.com/LTFS_Format_To%20Print.pdf.

Long Term File System Information Center 1.2.1.1, Overview, LTFS Format, IBM Corp., 2010, 1 pg.

HP Linear Tape File System (LTFS), HP OEM Newsletter, Sep. 2010, 15 pgs.

Anyone Using LTFS with LTO-5? Post, Reduser.net, Sep. 29, 2010, 3 pgs. at <<http://reduser.net/forum/showthread.php?t=50309>>.

Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.

Office Action for U.S. Appl. No. 13/109,192, mailed Dec. 17, 2012, 10 pgs.

Office Action for U.S. Appl. No. 13/267,743, mailed Dec. 19, 2012, 13 pgs.

International Preliminary Report on Patentability for PCT/US13/038755, issued Nov. 4, 2014, 6 pgs.

Notice of Allowance for U.S. Appl. No. 13/485,060, mailed Nov. 12, 2014, 4 pgs.

Office Action for U.S. Appl. No. 13/847,965, mailed Feb. 20, 2015, 36 pgs.

Office Action for U.S. Appl. No. 13/485,060, mailed Mar. 19, 2014, 7 pgs.

Notice of Allowance for U.S. Appl. No. 14/444,614, mailed Apr. 8, 2015, 10 pgs.

Office Action for U.S. Appl. No. 13/267,665 mailed Apr. 22, 2014, 12 pgs.

Office Action for U.S. Appl. No. 13/267,743, mailed May 7, 2015, 23 pgs.

Notice of Allowance for U.S. Appl. No. 13/109,192, mailed Apr. 24, 2013, 5 pgs.

Notice of Allowance for U.S. Appl. No. 13/267,665, mailed Jun. 3, 2015, 6 pgs.

Office Action for U.S. Appl. No. 13/950,075, mailed Jun. 26, 2015, 13 pgs.

Office Action for U.S. Appl. No. 13/267,743, mailed Jun. 19, 2013, 26 pgs.

Office Action for U.S. Appl. No. 13/267,743, mailed Aug. 5, 2014, 21 pgs.

International Search Report and Written Opinion for International Patent No. PCT/US2013/038755, mailed Aug. 6, 2013, 10 pgs.

Office Action for U.S. Appl. No. 14/444,614, mailed Oct. 7, 2014, 18 pgs.

Office Action for U.S. Appl. No. 13/267,665, mailed Oct. 22, 2014, 4 pgs.

Notice of Allowance for U.S. Appl. No. 13/451,812, mailed Jun. 30, 2014, 11 pgs.

Notice of Allowance for U.S. Appl. No. 13/485,060, mailed Jul. 17, 2014, 2 pgs.

Notice of Allowance for U.S. Appl. No. 13/267,665, mailed Dec. 12, 2013, 6 pgs.

Office Action for U.S. Appl. No. 13/451,812, mailed Dec. 17, 2013, 17 pgs.

Notice of Allowance for U.S. Appl. No. 14/444,614, mailed Aug. 17, 2015, 6 pgs.

Office Action for U.S. Appl. No. 13/847,965, mailed Aug. 24, 2015, 39 pgs.

Notice of Allowance for U.S. Appl. No. 14/444,614, mailed Nov. 19, 2015, 6 pgs.

Office Action for U.S. Appl. No. 13/950,075, mailed Nov. 30, 2015, 13 pgs.

Office Action for U.S. Appl. No. 13/847,965, mailed Dec. 14, 2015, 31, pgs.

Notice of Allowance for U.S. Appl. No. 13/267,665, mailed Jan. 15, 2016, 4 pgs.

Office Action for U.S. Appl. No. 14/593,657, mailed Mar. 9, 2016, 6 pgs.

Office Action for U.S. Appl. No. 13/267,743, mailed Mar. 22, 2016, 27 pgs.

Office Action for U.S. Appl. No. 13/950,075, mailed Apr. 15, 2016, 11 pgs.

Office Action for U.S. Appl. No. 13/847,965, mailed Jun. 29, 2016, 47 pgs.

Notice of Allowance for U.S. Appl. No. 14/593,657, mailed Jul. 22, 2016, 3 pgs.

Office Action for U.S. Appl. No. 13/267,665, mailed Aug. 15, 2016, 23 pgs.

Notice of Allowance for U.S. Appl. No. 13/950,075, mailed Sep. 30, 2016, 5 pgs.

Office Action for U.S. Appl. No. 13/267,743, mailed Oct. 5, 2016, 30 pgs.

Office Action for U.S. Appl. No. 15/072,407, mailed Nov. 28, 2016, 20 pgs.

\* cited by examiner

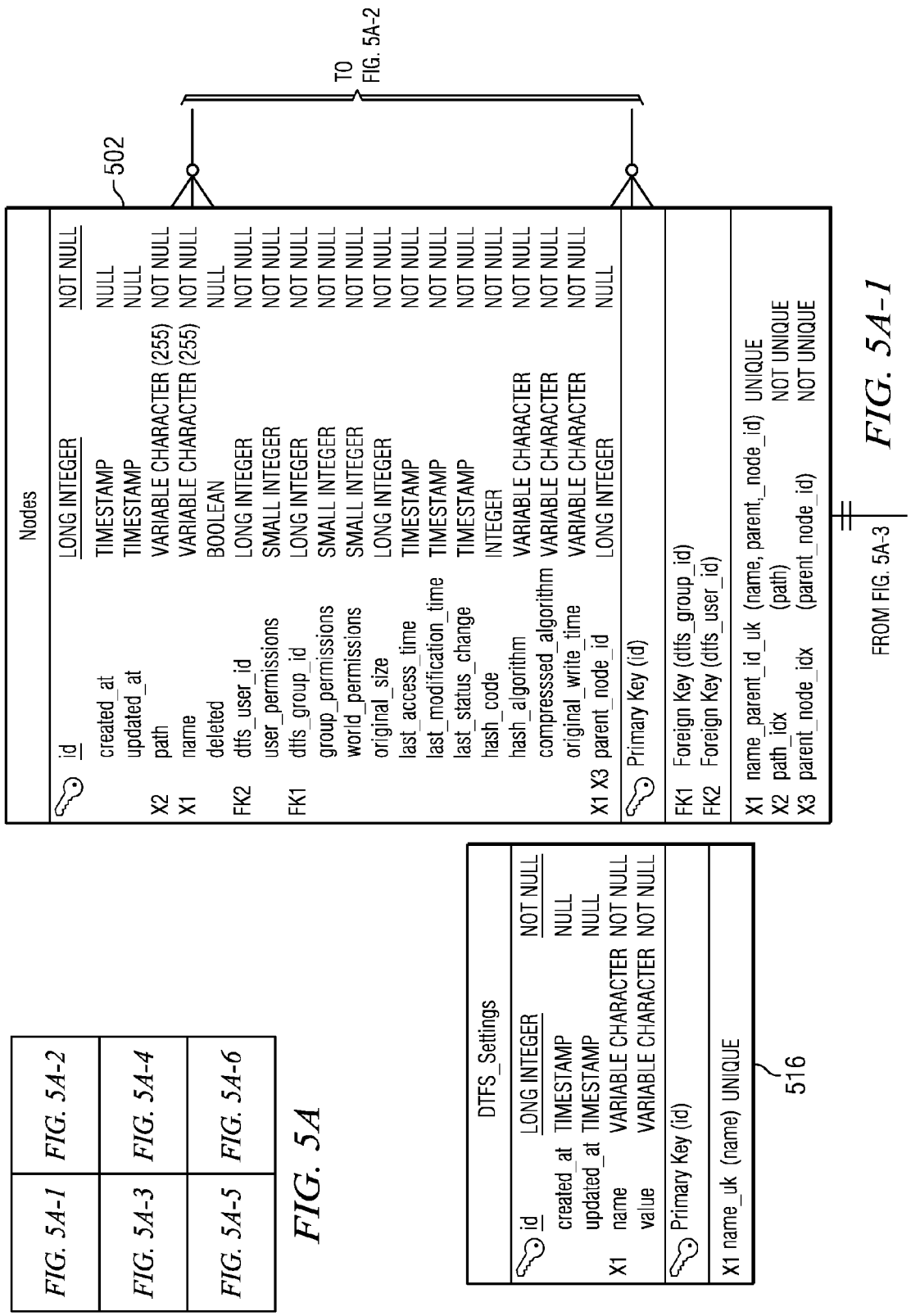

| Tape_Drives 522 | | |
|---|---|---|
| 🔑 id | LONG INTEGER | NOT NULL |
| created_at | TIMESTAMP | NULL |
| updated_at | TIMESTAMP | NULL |
| X1 element_id | INTEGER | NOT NULL |
| X2 serial_number | VARIABLE CHARACTER | NOT NULL |
| X2 vendor | VARIABLE CHARACTER | NOT NULL |
| last_cleaning_time | TIMESTAMP | NULL |
| description | VARIABLE CHARACTER | NULL |
| 🔑 Primary Key (id) | | |
| X1 drive_uk | (element_id) | UNIQUE |
| X2 serial_number_uk | (serial_number, vendor) | UNIQUE |
| X3 tape_idx | () | NOT UNIQUE |

FROM FIG. 5A-3

*FIG. 5A-4*

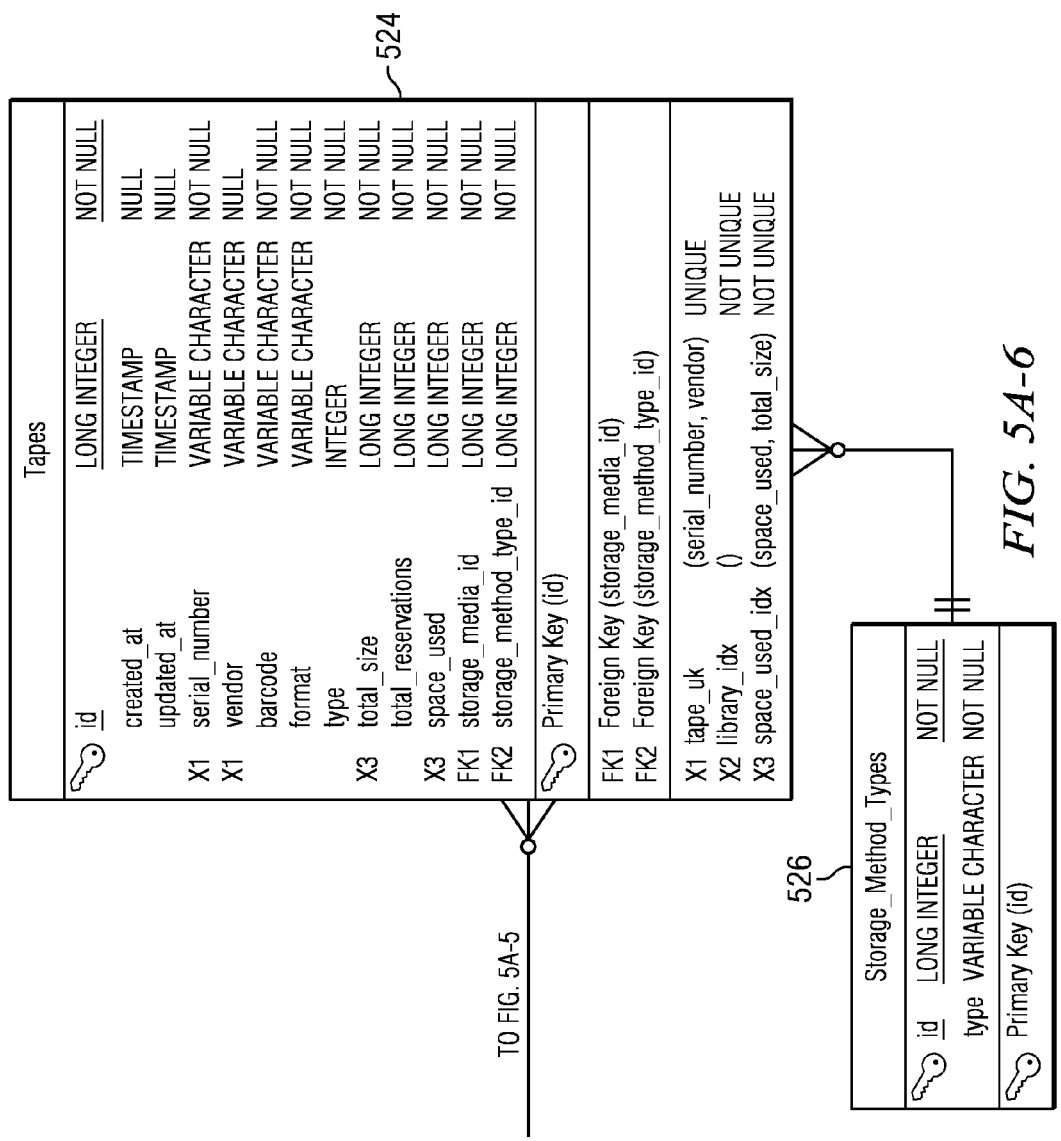

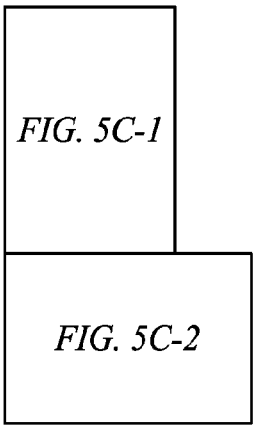

| Nodes | | | |
|---|---|---|---|
| 🗝 | id | LONG INTEGER | NOT NULL |
| | created_at | TIMESTAMP | NULL |
| | updated_at | TIMESTAMP | NULL |
| X2 | path | VARIABLE CHARACTER (255) | NOT NULL |
| X1 | name | VARIABLE CHARACTER (255) | NOT NULL |
| | deleted | BOOLEAN | NULL |
| FK2 | dtfs_user_id | LONG INTEGER | NOT NULL |
| | user_permissions | SMALL INTEGER | NOT NULL |
| FK1 | dtfs_group_id | LONG INTEGER | NOT NULL |
| | group_permissions | SMALL INTEGER | NOT NULL |
| | world_permissions | SMALL INTEGER | NOT NULL |
| | original_size | LONG INTEGER | NOT NULL |
| | last_access_time | TIMESTAMP | NOT NULL |
| | last_modification_time | TIMESTAMP | NOT NULL |
| | last_status_change | TIMESTAMP | NOT NULL |
| | hash_code | INTEGER | NOT NULL |
| | hash_algorithm | VARIABLE CHARACTER | NOT NULL |
| | compressed_algorithm | VARIABLE CHARACTER | NOT NULL |
| | original_write_drive | VARIABLE CHARACTER | NOT NULL |
| X1 X3 | parent_node_id | LONG INTEGER | NULL |
| 🗝 Primary Key (id) | | | |
| FK1 Foreign Key (dtfs_group_id) | | | |
| FK2 Foreign Key (dtfs_user_id) | | | |
| X1 name_parent_id_uk  (name, parent_node_id)  UNIQUE | | | |
| X2 path_idx             (path)                 NOT UNIQUE | | | |
| X3 parent_node_idx      (parent_node_id)       NOT UNIQUE | | | |

— 502

*FIG. 5C-1*    FROM FIG. 5C-2

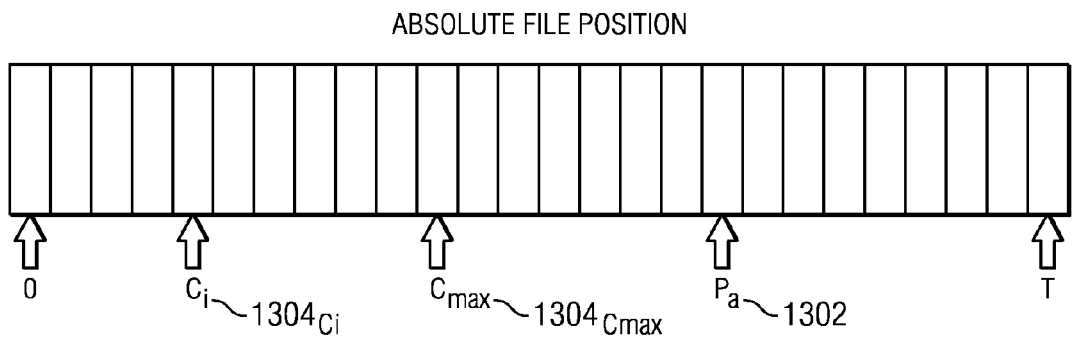
FIG. 13
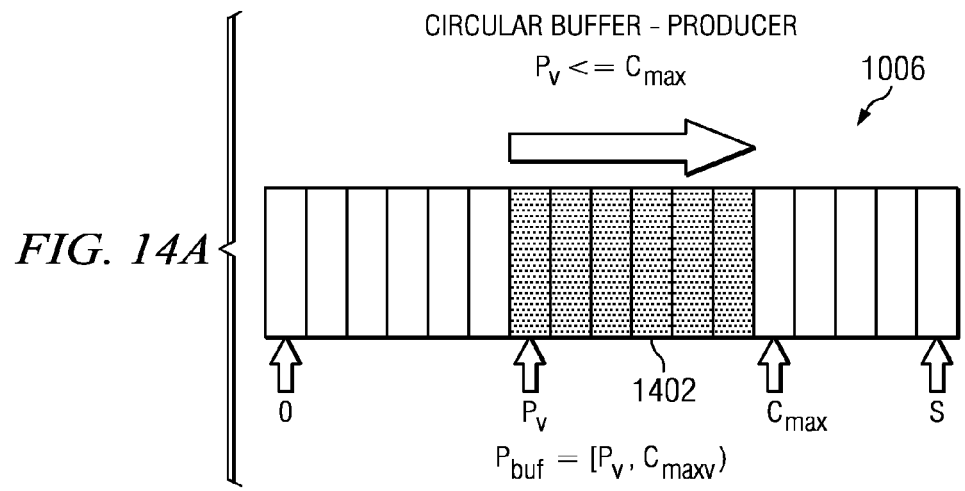
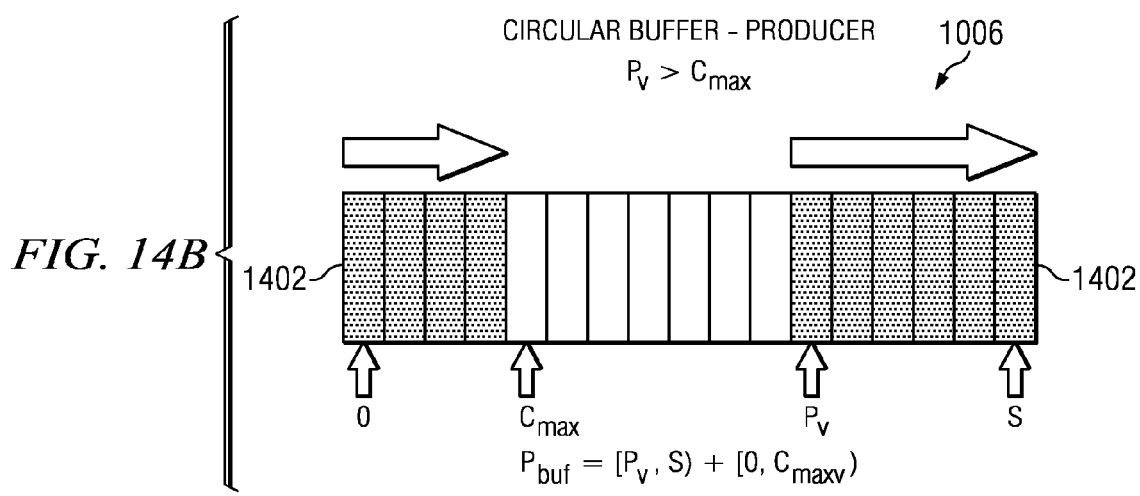

SYSTEM AND METHOD FOR USING A MEMORY BUFFER TO STREAM DATA FROM A TAPE TO MULTIPLE CLIENTS

TECHNICAL FIELD

Embodiments described herein provide systems and methods for streaming data to multiple reading clients. More particularly, embodiments described herein provide systems and methods for using a memory buffer to stream file data from a mounted tape file system volume to multiple reading clients.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

Recently, the Linear or Long Term File System (LTFS) Format Specification by IBM and Ultrium (hereby fully incorporated by reference in its entirety for all purposes) has been developed, which defines a file system for LTO-5 tapes, LTO-6 tapes and may be extended to other tapes using an eXtensible Markup Language (XML) schema architecture. This file system support allows the use of an LTFS-formatted tape as if it were a file system. Files and directories may appear in a directory listing, files may be dragged and dropped from tape, data may be accessed at the file level, etc. Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

However, LTFS does not provide an adequate mechanism for making the files on LTFS tapes available over a network to multiple clients.

SUMMARY

Embodiments described herein provide systems and methods for using a memory buffer to stream file data from a mounted tape to multiple reading clients.

One embodiment described herein can include a system for providing a network based file system comprising a memory, a processor and a computer readable storage medium storing a set of computer program instructions. The computer instructions can be executable to initiate a tape streaming session corresponding to a requested file and allocate a circular buffer in a memory for the tape streaming session. The computer program instructions can be further executable to perform the following steps during the tape streaming session: store file data read from an LTFS volume in the buffer, restore the file to the disk-based cache from the buffer, reply to read requests for file data of the file from non-lagging network file system interface clients associated with the tape streaming session from the buffer and reply to read requests for file data of the file from lagging network file system interface clients from the disk-based cache.

Another embodiment can comprise a computer program product comprising non-transitory computer readable medium storing a set of computer program instructions. The computer program instructions can comprise instructions executable to initiate a tape streaming session corresponding to a file, allocate a circular buffer in memory for the tape streaming session, store file data in the buffer read from an LTFS volume, restore a file to the disk-based cache from the buffer, reply to read requests for file data from non-lagging network file system interface clients associated with the tape streaming session from the buffer and reply to read requests for file data from lagging network file system interface clients from the disk-based cache.

Yet another embodiment can include a method for streaming file data from a tape. The method can include the steps of interfacing with a media library having tapes storing files according to a tape file system, maintaining a read cache of files in a data store that contains file stubs of files in the media library and presenting a network file system interface to clients. The method can further include, for a request for a file having a file stub in the read cache, initiating a tape streaming session corresponding to the file and allocating a buffer in memory for the tape streaming session. The method can still further include storing file data for the file read from a tape file system volume in the buffer, restoring the file to the data store from the buffer, replying to read requests for file data of the file from the buffer for read requests from non-lagging network file system interface clients associated with the tape streaming session and replying to read requests for file data of the file from the data store from lagging network file system interface clients.

Embodiments described herein provide an advantage by removing the slowest reading components from the streaming buffer.

Embodiments described herein provide another advantage because network file system interface clients are able to read the file as fast as possible within the limits of connection speed and the tape drive's ability to read the file from tape.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 13 is a diagrammatic representation of file positions for a file having a total size "T" being read from tape.

FIG. 14A is a diagrammatic representation of one embodiment of a producer virtual buffer.

FIG. 14B is a diagrammatic representation of one embodiment of a consumer virtual buffer.

DETAILED DESCRIPTION

Figure 1:
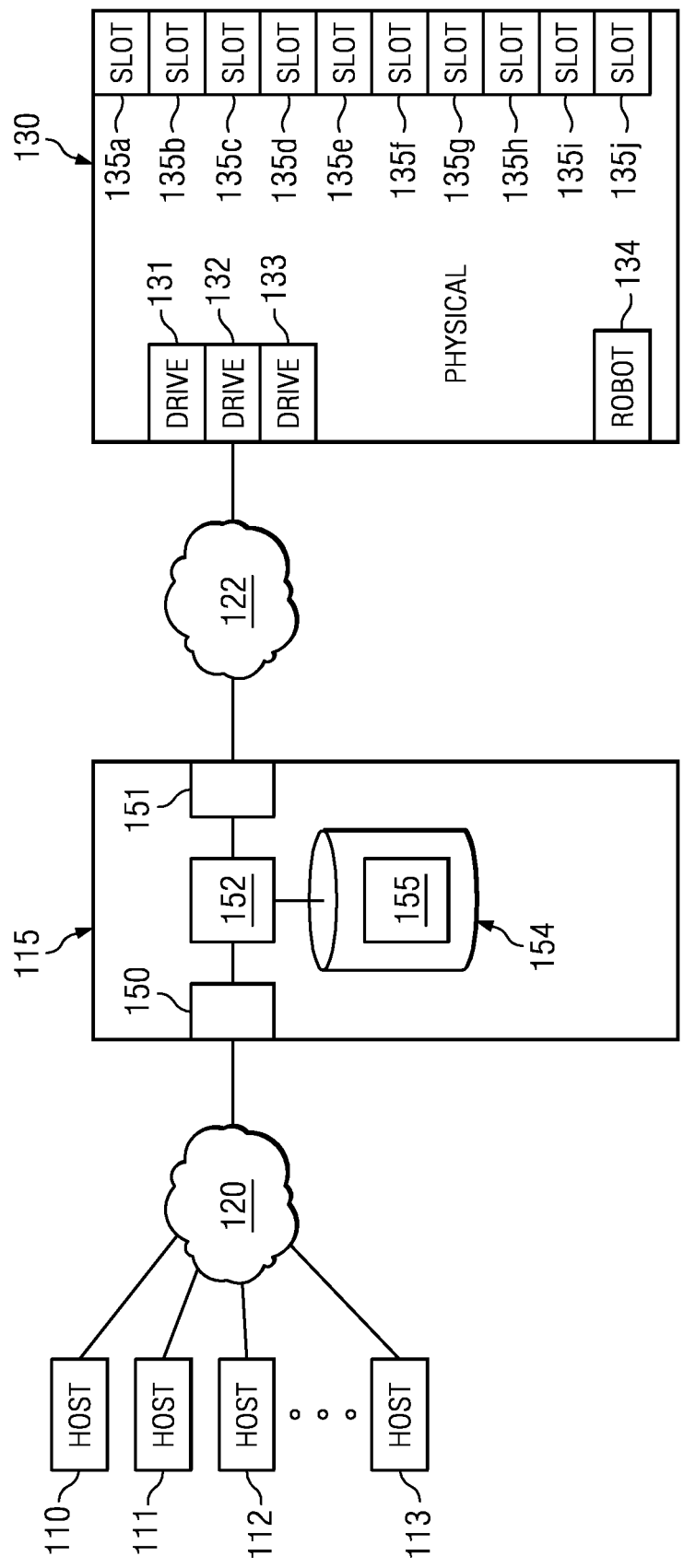
FIG. 1 is a diagrammatic representation of one embodiment of system comprising an Archive Node Appliance.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It will be recalled from the above discussion that in many instances it may be desired to provide a file system utilizing media libraries. To that end, attention is now directed to systems and methods for implementing a file system utilizing a tape library. In particular, embodiments may present a network based file system to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library.

In certain embodiments, LTFS (including Library LTFS) may be employed in conjunction with the tape library such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library. It should be noted here that while embodiments as discussed include a tape library having tapes formatted according to LTFS, other types of media libraries that utilize media of the same or different type where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been migrated all, or a portion of, that file may be deleted from the disk. When a file is subsequently accessed it can be determined if the file is on the disk or stored on tape. The file can then be accessed from the disk, a tape or a combination of the two. File operations performed through the network file system can occur on files in the data store, rather than directly on the file on tape.

In some cases, it may be desirable to move a tape from one system to another and have the files on tape presented out in a similar manner by the second system as was done by the first system. Accordingly, embodiments provided herein can utilize self-describing tapes that allow the files read from the tape to be presented out similarly by multiple systems. The tape can store metadata of both the file system used to store files on the tape (e.g., LTFS) and the file system used to present out the files read from the tape to provide for consistent file descriptions between systems.

FIG. 1 is a diagrammatic representation of a system in which a media library is managed to present a network based file system to a plurality of hosts (i.e. host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135*a-j*). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g. RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any other type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5, LTO-6 compliant drives and tapes in media library 130 may be formatted according to LTFS (as disclosed in the Linear Tape File System Format Specification Version 2.0, or other version by IBM, hereby incorporated by reference in its entirety). In other embodiments the drives may be compliant with other types of tapes and the tapes may be formatted according to other tape file systems. Computer instructions 155 may be executable to store files received through the networked based file system on the LTFS tapes in the media library 130 and maintain mapping information between the files visible through the network based file system and the location of those files in the media library.

The files visible through the network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the remainder of the file into the intermediate storage.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130. In this case, computer executable instructions 155 are executable to maintain mapping information between the files visible through the network based file system and the location of those files on the computer readable memory 154 or the media library 130.

The use of LTFS in conjunction with the media library 130 can afford a number of advantages when employed by an Archive Node Appliance 115 to implement a networked based file system. One important advantage is that the file system structure presented through the file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application.

Figure 2:
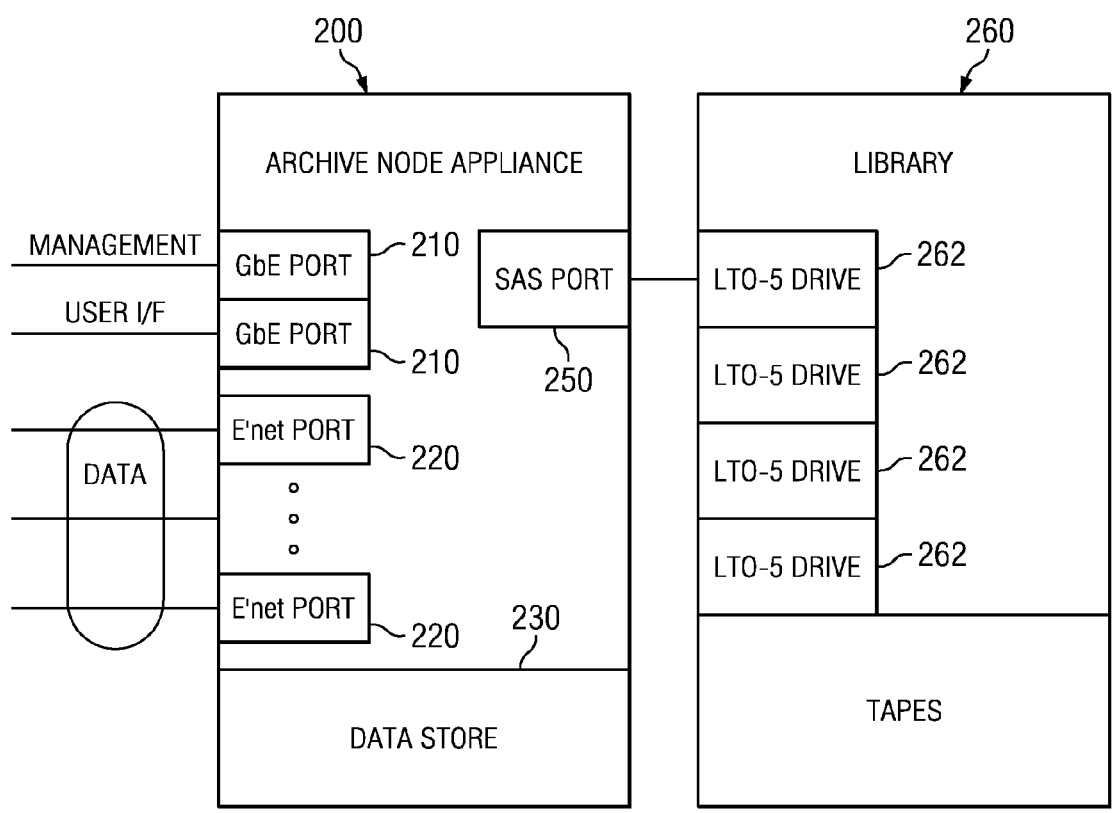
FIG. 2 is a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, the Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). The Archive Node Appliance 200 may also comprise one or more Ethernet ports 220 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 220 may be coupled to hosts, such that a network based file system may be provided by the Archive Node Appliance 200 and hosts may interface with the Archive Node Appliance 200 using these Ethernet ports 220 to utilize the network based file system, for example, by storing or retrieving files using the network based file system. The network based file system may be implemented using a file system implemented in association with user space such as the File system in User space (FUSE) file system; using a kernel-based file system such as Ext2, Ext3, Ext4 Next3, etc.; or almost any other type of file system desired.

Archive Node Appliance 200 also includes a data store 230. Data store 230 may be a computer readable memory used to store computer executable instruction, files stored using the network based file system or other data utilized by Archive Node Appliance 200, as will be elaborated on in more detail subsequently. To ensure some degree of redundancy or fault tolerance, data store 230 may implemented as Redundant Array of Independent Disks (RAID) storage having around 5 TB-8 TB of available storage. Archive Node Appliance 200 also comprises a SAS port 250 through which the Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges. In other embodiments, the media library may include LTO-6 compliant drives or other types of drives.

While it should be noted that Archive Node Appliance 200 may be implemented in substantially in any form factor desired, in one embodiment Archive Node Appliance may be based on a rack-mount storage format and may, for example, be contained in a chassis of a 1U, 2U or 3U form factor with the data store residing internally to the chassis.

Figure 3:
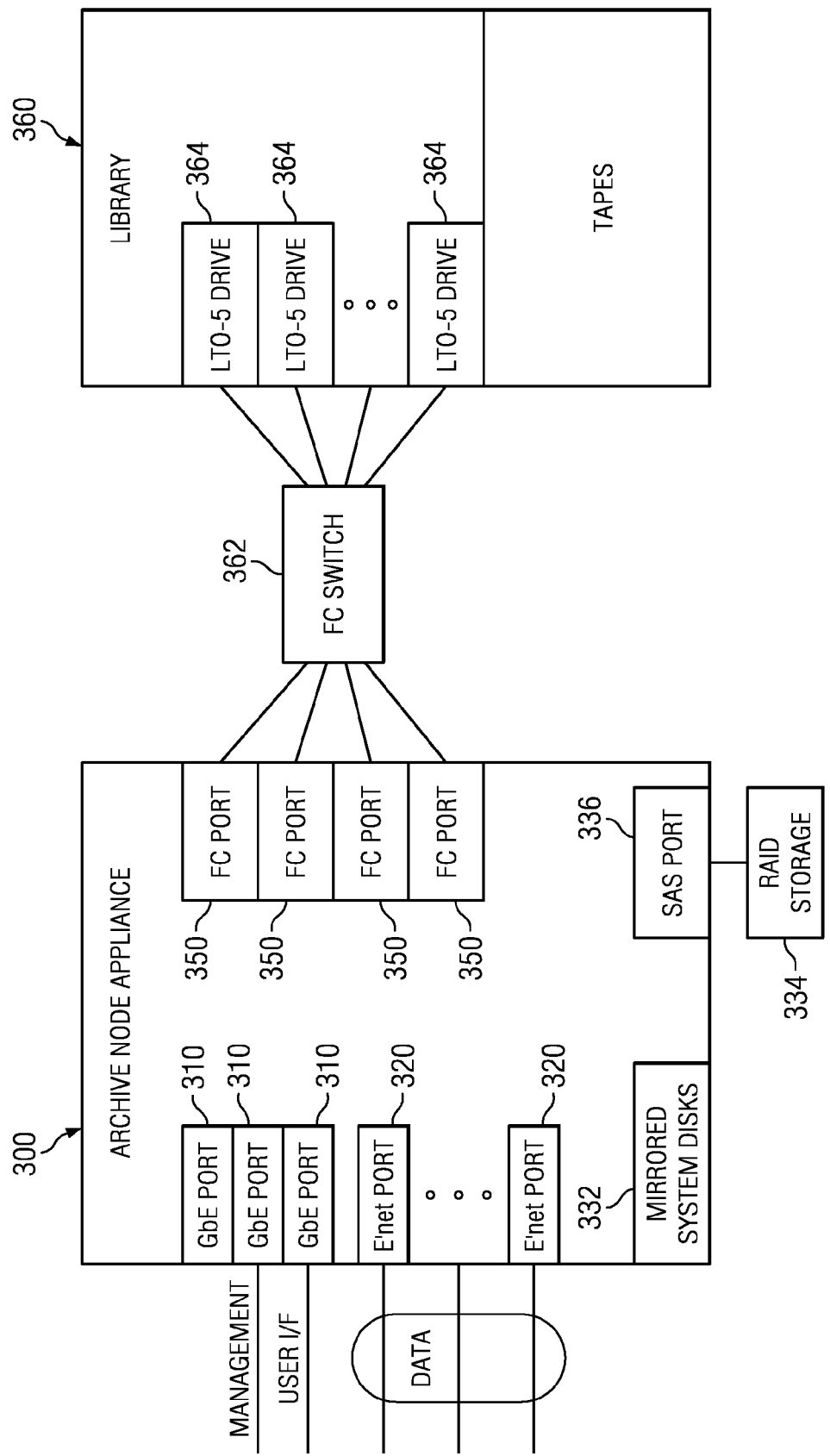
FIG. 3 is a diagrammatic representation of one embodiment of an Archive Node Appliance.

Moving on, FIG. 3 depicts one embodiment of an architecture for an Archive Node that may be used in instances where relatively greater storage capacity is required, such as in, for example, large data installations or a cloud storage provider. In this embodiment, the Archive Node Appliance 300 may comprise one or more Gigabit Ethernet ports 310. These Gigabit Ethernet ports 310 may be dedicated to providing a user interface or for a systems management interface. The Archive Node Appliance 300 may also comprise one or more Ethernet ports 320 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types. In operation these Ethernet ports 320 may be coupled to hosts, such that a network based file system may be provided by the Archive Node Appliance 300 and hosts may interface with the Archive Node Appliance 300 using these Ethernet ports 320 to utilize the network based file system, for example, by storing or retrieving files using the network based file system. As noted above, the network based file system may be implemented using a file system implemented in association with user space such as the File system in User space (FUSE) file system; using a kernel-based file system such as Ext2, Ext3, Ext4 Next3, etc.; or almost any other type of file system desired. Archive Node Appliance 300 also includes a data store 334.

Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by the Archive Node Appliance 300 during operation and Redundant Array of Independent Disks (RAID) storage 334 coupled to the Archive Node Appliance 300 through SAS port 336. The RAID storage may be used to store files associated with the network based file system and may have around 9 TB-150 TB of available storage.

Archive Node Appliance 300 also comprises fibre channel ports 350 through which the Archive Node Appliance 300 is coupled to media library 360 via a fibre channel switch 362. These fibre channel ports 350 may be, for example, 16, 8, 4 or 2 GB fibre channel ports. Media library 360 may be an IBM TS3500 tape library having one or more LTO-5 compliant drives 364 and capable of holding around 20,000 tapes, a media library having one or more LTO-6 compliant drives or a media library supporting other types of tapes that can be formatted according to a tape file system.

Again, while it should be noted that Archive Node Appliance 300 may be implemented in substantially in any form factor desired, in one embodiment Archive Node Appliance 300 may be based on a rack-mount storage format and may for example, be contained in a chassis of a 1U, 2U or 3U form factor with the data store residing internally to the chassis or portions of the data store, such as the RAID storage residing external to the chassis.

Figure 4:
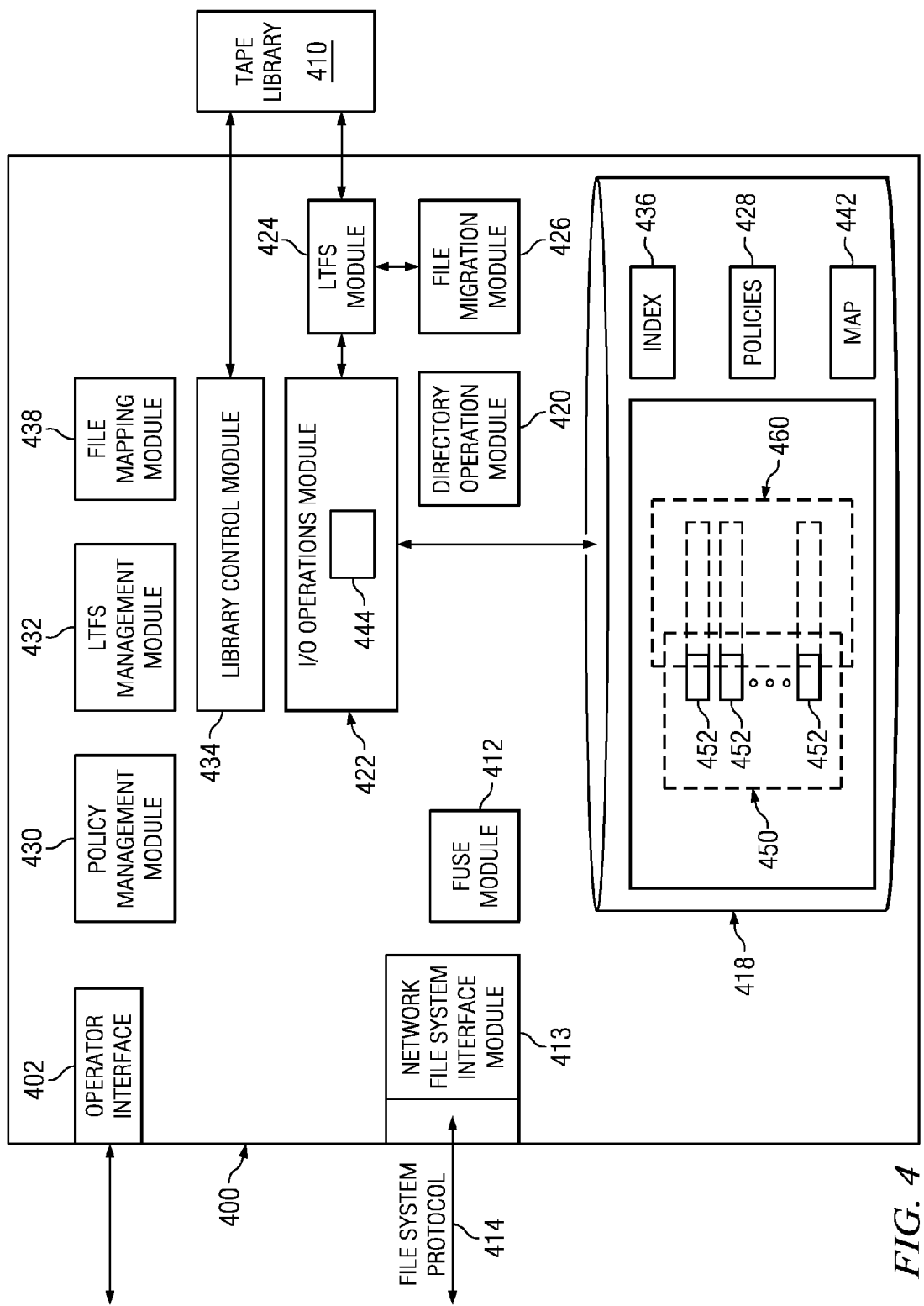
FIG. 4 is a diagrammatic representation of one embodiment of an Archive Node Appliance.

Turning now to FIG. 4, one embodiment of a functional architecture for an Archive Node is depicted. Archive Node Appliance 400 may provide an operator interface 402 through which the Archive Node Appliance 400 may be configured. Such an operator interface 402 may be provided, for example, using a network based interface such as a set of web pages or the like. Archive Node Appliance 400 is coupled to tape library 410, comprising a set of LTO-5, LTO-6 or other tape compliant drives some of which may be LTFS (or other tape file system) formatted tapes. In one embodiment, each tape in tape library 410 may be used to store data that is compressed, data that is encrypted, data that is both compressed and encrypted or data that is neither compressed nor encrypted.

Archive Node Appliance 400 comprises Filesystem in Userspace (FUSE) module 412 that may presents a file system to a local operating system. A network file system interface module 413 provides access to all or a portion of the FUSE file system as one or more shared volumes (e.g., as a hierarchical file system with directories, etc.) that can be accessed using an interface that operates according to network file system protocol 414 such as NFS, CIFS, FTP, REST etc. Data associated with the shared volumes is stored on one or more partitions of data store 418 (a computer readable memory), where the structure of the partitions of the data store 418 may, or may not, correspond to the structure of the shared volumes or to the structure of the file system presented by FUSE module 412.

Directory operations module 420 is configured to process any directory operations that are received by FUSE module 412. I/O operations module 422 is configured to process any input or output operations involved with the reading or the storing of files associated with the file system presented by the FUSE module 412. These operations include, for example, the writing of files to the data store 418, the reading of files from the data store 418, the deletion of files from the data store 418, the reading of files from a tape in the tape library 410 or other operations associated with the data store 418 or tape library 410.

These I/O operations may involve the use of library control module 434, LTFS module 424, LTFS management module 432 and index 436. The location of each tape within the tape library 410 may be maintained in index 436 (e.g. in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 434 is configured to control the movement of the tapes in the tape library 410, including ejecting the tapes from the drives of the tape library 410, and the movement of tapes to and from slots of the tape library 410 and in and out of drives of the tape library using the robot. LTFS management module 432 is configured to mount or unmount the LTFS file system on a particular tape in a drive of the tape library 410. LTFS module 424 is configured to perform LTFS operations with respect to an LTFS mounted file system.

Library control module 434, LTFS module 424, LTFS management module 432 and index 436 may also be utilized by file migration module 426. File migration module 426 is configured to move files from data store 418 to tape library 410 based on policies 428. File mapping module 438 maintains map 442 which correlates a file visible through the FUSE file system to its corresponding location in the tape library 410. Specifically, a mapping between the location (for example the path) and name of the file with respect to the FUSE file system, the name and location of that file in the data store 418 and the name and location of that file on one or more tapes in the tape library 410 may be maintained in map 442.

Policies 428 may, or may not be, user configured and may be associated with storage of the files or the migration of files from the data store 418 to tapes in the tape library 410. Such policies may specify, for example, how long to wait before migrating a file (referred to herein as a migration timeout period), whether the files are to be replicated when migrated (e.g. stored in conjunction with multiple Archive Nodes as will be elaborated on in more detail), how many copies of the file to keep, where the multiple copies are to be kept on different tapes, whether the file is to be encrypted or compressed, etc. The policies 428 may be defined with respect to the directories presented with respect to the FUSE module 412 such that those policies may be defined with respect to all files within that directory. Policy management module 430 allows these policies to be managed (e.g., created, updated, defined, deleted, modified, etc.) by a user or otherwise. Policies can be defined at any level of the directory structure provided by FUSE module 412. Because a directory presented by FUSE module 412 may be presented as a shared volume by network file system interface module 413, a policy that applies to the directory may also apply to the share.

In operation then, Archive Node Appliance 400 may present a network based file system accessible through an interface, where the files associated with the network based file system may be stored on the tape library 410 according to a file system structure that substantially mirrors the file system structure of the presented network based file system. In one embodiment, mirroring the file system structure of the presented network based file system means that at least a portion of the path of the location of the file as it is stored on the tape library 410 may be substantially similar to the path of the location of the file as it is presented through the file system.

More specifically, users at host devices coupled to the Archive Node Appliance 400 may perform directory operations and store or read files using an interface for the network based file system provided by the Archive Node Appliance 400. In accordance with these user initiated operations, commands in the network file system protocol 414 employed by the interface may be received at the Archive Node Appliance 400 and implemented by FUSE module 412 with respect to the partitions of data store 418.

If the command is associated with a directory operation it may be processed by directory operations module 420. If the command is for the storing of a file, the I/O operations module 422 may write this file to a location in the data store 418. Map 442 may be updated to comprise a mapping between the location and name of the file with respect to the FUSE file system and the name and location of that file in the data store 418.

In one embodiment, the file is stored in the data store 418 according to the one or more policies that apply to that file. For example, if a policy that applies to the file specifies that the file should be compressed the file may be compressed before the file is stored in the data store 418. Similarly, if an applicable policy specifies that the file is to be encrypted the file may be encrypted before it is stored in the data store 418. In certain embodiments, a self-encrypting disk, full disk encryption or a RAID controller which performs encryption may be utilized in conjunction with data store 418, such that all files stored in the data store 418 may be encrypted by the disk or controller when the file is stored to the data store 418. In such cases, all files stored to the data store 418 may be encrypted when stored to data store 418 and decrypted when read from data store 418.

Based on one or more of the policies 428, at some later point a file may be migrated to the tape library 410. As policies 428 may be defined based on a location associated with the presented file system, policies associated with the location (e.g. directory, share, etc.) where the file is stored may be determined from policies 428 and the determined policies applied to migrate the file.

As the file may be received over a network, errors may occur during the transmission of the file or the storage of the file to the data store. To account for network errors or the like, in one embodiment, a time period referred to as the migration timeout period is utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance.

In any event, once a file is selected for migration, the one or more policies 428 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using the index 436. If the appropriate tape is not currently in a drive of the tape library, library control module 434 may be utilized to load the appropriate tape into a drive of the tape library 410. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 432. File migration module 426 may use LTFS module 424 to copy the file from data store 418 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by the Archive Node Appliance 400. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to the LTFS module 424 that data to be stored on the tape is to be compressed. The LTFS module 424 may configure the drive holding that tape to compress data such that when the file is stored to the tape using LTFS module 424 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,181, entitled "System and Method For Enabling Encryption", by Robert C. Sims, filed on Feb. 4, 2008 which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the FUSE file system. Notice here that two separate tapes may have the file stored using an LTFS file system path that mirrors the path of that file as presented through the FUSE file system. Furthermore, if a policy associated with the file specifies that the file is to be replicated the file may also be sent to another Archive Node Appliance, as will be discussed in more detail.

In addition to storing files on the tape, the archive node appliance may store file system metadata of the FUSE file system (or other file system) on the tape in addition to the metadata stored according to the LTFS file system. The metadata stored may include information necessary for the FUSE file system of another archive node appliance to present files from the tape in a similar manner as the FUSE file system of the originating archive node appliance, including associating the file with the same users, policies, etc.

When a command to read a file is received, map 442 may be consulted to determine the location of the file (e.g., whether it is located in data store 418, on a tape in the tape library 410 or both). If the requested file is completely on the data store 418, I/O operations module 422 may respond to the read of the file using the file as stored in the data store 418. If the file is on a tape (and not entirely in the data store 418), the tape on which the file is located may be determined using the map 442. The index 436 and the library control module 434 can then be utilized to determine if the tape is in a drive, and if not, to load the appropriate tape into a drive of the tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed as the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS file system on the tape on which the file is stored one or more commands (for example, SCSI or other types of commands that may or may not include key information to be utilized) may be sent to the drive to cause it to decrypt the file. The LTFS file system can then be mounted on the tape. LTFS can then be used to read the file while the tape drive handles the decryption of the data transparently to LTFS. The file is then used to respond to the read of the file.

If the file is located on the tape and the FUSE file system does not contain metadata for the file, the FUSE file system metadata stored on the tape can be read and stored. Consequently, if files on the tape were originally stored by a first archive node appliance and the tape read by a second archive node appliance, the file system of the second archive node appliance will have the information necessary to describe the files, including information not typically maintained or used by the LTFS file system of the tape.

In many cases, however, if the file is located on tape, it may take a relatively long amount of time to access the file. This situation may be exacerbated if, for example the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. The timeout condition may be dependent on the type of network file systems used. In some cases, the timeout period is negotiated between a host and file system. Thus, the Archive Node Appliance 400 can be configured to negotiate the timeout time with hosts. The timeout time can be set in a configuration setting for Archive Node Appliance 400. As a result, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise the first portion 452 of each file stored using the network based file system presented by the Archive Node Appliance 400. When a file is read, then, if any portion of the file is to be read from tape the first portion 452 of the read file that is stored in the read cache 450 may be used to respond to the read, while substantially simultaneously accessing the file on the tape. Since the first portion 452 of the file is stored in the read cache 450 on the data store 418 it can be accessed quickly enough that a timeout on commands can be avoided while the file on the tape is accessed. The remainder of the file can then be read from the tape and used to respond to the commands. The size of the first portion 452 of each file may be user configurable, based on system parameters, or defined in some other manner.

It will be noted that the read cache 450 may comprise first portions 452 of none, all, or some subset of, the files that are stored in conjunction with the network based file system. For example, if data store 418 is corrupted or otherwise unusable, when the data store 418 is replaced read cache 450 may comprise first portions 452 of none of the files. The read cache 450 may then be repopulated as files are accessed by users through the network based file system. During this repopulation then, read cache 450 may comprise first portions 452 of some subset of the files that are stored in conjunction with the network based file system.

Accordingly, in some embodiments, when a file is read if any portion of the file is to be read from tape it can be determined if the first portion 452 of that file is in the read cache 450. If it is that first portion 452 may be used to respond to the read as detailed above. If, however, the first portion 452 of the read file is not in read cache 450, the file may be read from tape and used to respond to the read. Additionally, the file data read from tape may be used to repopulate the read cache 450 by storing the first portion 452 of the read in the read cache 450 at that time (embodiments of which will be discussed in more detail below).

In one embodiment, as a CIFS command may have a 30 second timeout period and an average or poor timing scenario for a tape access may be on the order of 4 minutes, the first portion 452 of each file stored in the read cache 450 may comprise the first 512K of each file. In one embodiment, the read cache size may be based on directories provided by the FUSE module 412 so that all the files within the directory are a particular size. If the directory is presented as a share, the policy thus applies to files within the share. In another embodiment, the size retained on read cache 450 may be dependent upon the size of blocks that may be read in a single operation via the network file system, the set time for a timeout and the time required to load, mount and position a tape with the requested file. It will be noted that the data in the read cache 450 may be stored in a manner corresponding to the format in which the file is stored on the tape. Thus, for example, if the file is compressed when it is migrated to tape the read cache 450 may comprise the first portion 452 of the file in compressed format, where this first portion equals approximately 512 k of data when uncompressed.

Initially then, when a host device using a CIFS based file system provided by the Archive Node Appliance wishes to read a file it may send an OPEN command to the Archive Node Appliance 400. I/O operations module 422 may determine if the requested file is completely in the data store 418 using map 442. If so, I/O operations module 422 may respond to the read of the file using the file in the data store 418.

If however, the file is on a tape, the tape on which the file is located may be determined using the map 442. The I/O operations module 422 can then initiate the load and access of the file on the tape using the library control module 434 and the LTFS management module 432. I/O operations module 422 delays the response to the initial OPEN command for a time period less than the timeout associated with the received command. In some embodiments, this time period may be the longest time period that does not result in a timeout occurring (e.g., 20 seconds, 29 seconds in the case of CIFS commands, or another time period in the case of commands in other protocols, etc.).

The host device may subsequently send a READ command for a certain amount (e.g., 64K or a different amount) of the file to the Archive Node Appliance 400. I/O operations module 422 can delay the response to this READ command as long as possible without a timeout resulting (e.g., 20 second, 29 seconds, in the case of CIFS commands, or another time period below the 30 second timeout in the case of commands in other protocols). After the delay, the I/O operation module 422 will respond to the command with the data requested. The I/O operations module 422 may continue to delay responses to subsequent READ commands and utilize data from the read cache 450 to respond to the READ commands until data from the first portion 452 is exhausted or the LTFS file system on the appropriate tape is mounted and the file on the tape can be accessed using LTFS module. The I/O operations module may continue to delay responses and dynamically switch between delaying responses and not delaying responses as needed.

In addition to delaying responses, Archive Node Appliance 400 can return less data than requested by the host. For example, Archive Node Appliance 400 may return 1K instead of the requested 64K. Whether Archive Node Appliance 400 returns less data than the amount requested may depend on the network file system protocol, host operating system or other factors. Returning less data than requested provides the advantage that the read cache can be smaller.

I/O operation module 422 may then use LTFS module 424 to access the file on the tape and respond to subsequent READ commands for the file. More specifically, in one embodiment I/O operations module 422 may utilize LTFS module 424 to access the file on the appropriate tape and read the file from the tape into buffer 444. Subsequent READ commands for the file may be responded to using the data in the buffer 444.

Furthermore, in some embodiments, in addition to reading the file into buffer 444 the file may also be read into a file cache 460 on the data store. File cache 460 may be an area on data store utilized for temporary storage of files and may be managed according to almost any cache management technique desired. In certain cases if a host does not request data of the file at a particular rate (e.g., does not issue READ commands frequently enough, or the READ commands do not request a certain amount of data, etc.), after a certain number of READ commands I/O operations module 422 may respond to subsequent READ commands for the file using data of the file from the file cache.

In certain embodiments the opposite may also occur. More specifically, in some instances the reading of file data to the file cache 460 in addition to reading the file into buffer 444 may slow the response to requests for data from the host. In this case, reading the file data into both buffer 444 and file cache may mean that data cannot be delivered at the rate the user is requesting the data or may otherwise slow the response to user requests. Here, the reading of the data of the file into the file cache 460 may be stopped before the entire file is in the file cache such that requests for the file may be serviced more quickly. Thus, the portion of the file that is in file cache 460 may comprise none, some, or all, of a file.

In one embodiment, the file may be stored in the file cache 460 by appending any portions of the file which are read from the tape to the first portion 452 of the file in the read cache 450 if such a first portion of the read file exists in read cache 450. Thus, if the first portion 452 exists in the read cache 450 when any portion of the file not comprised by first portion 452 in the read cache is read from the tape it may be appended to the first portion 452 already stored in the read cache 450. In either case (the first portion 452 does, or does not, exist in the file cache) the entire file may be stored in the file cache 460 when the file is read. Thus, at a later point, if portions of the file are deleted from the file cache 460 the first portion 452 of the file may be left on the data store 418 such that the first portion 452 of the file is in read cache 450. Accordingly, the read cache 450 will be repopulated with the first portion of that file if the first portion 452 was not in the read cache 450 before the file was read.

It may be useful to discuss embodiments of the storage of mapping data, index data, policies, file meta-data, tape-library data, etc. that may be utilized by an Archive Node Appliance. Embodiments of such storage methods and formats may be used, for example, to store the map, index and policies as discussed above. FIGS. 5A-5D depict one embodiment of a schema for a database that may be utilized in conjunction with embodiment of an Archive Node.

Figures 2, 5A:
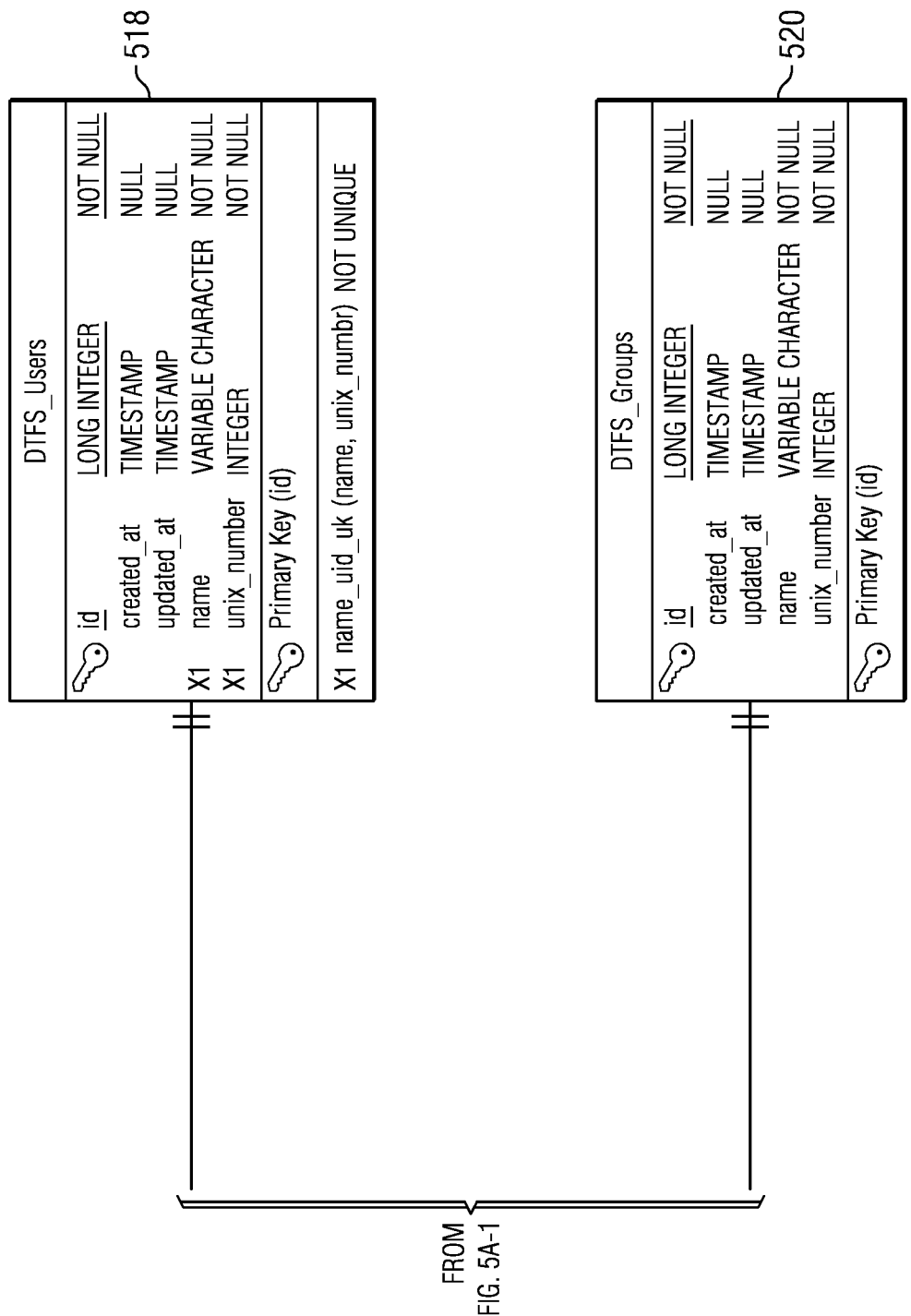
FIGS. 5A-5D are diagrammatic representations of one embodiment of a schema.
Figures 3, 5A:
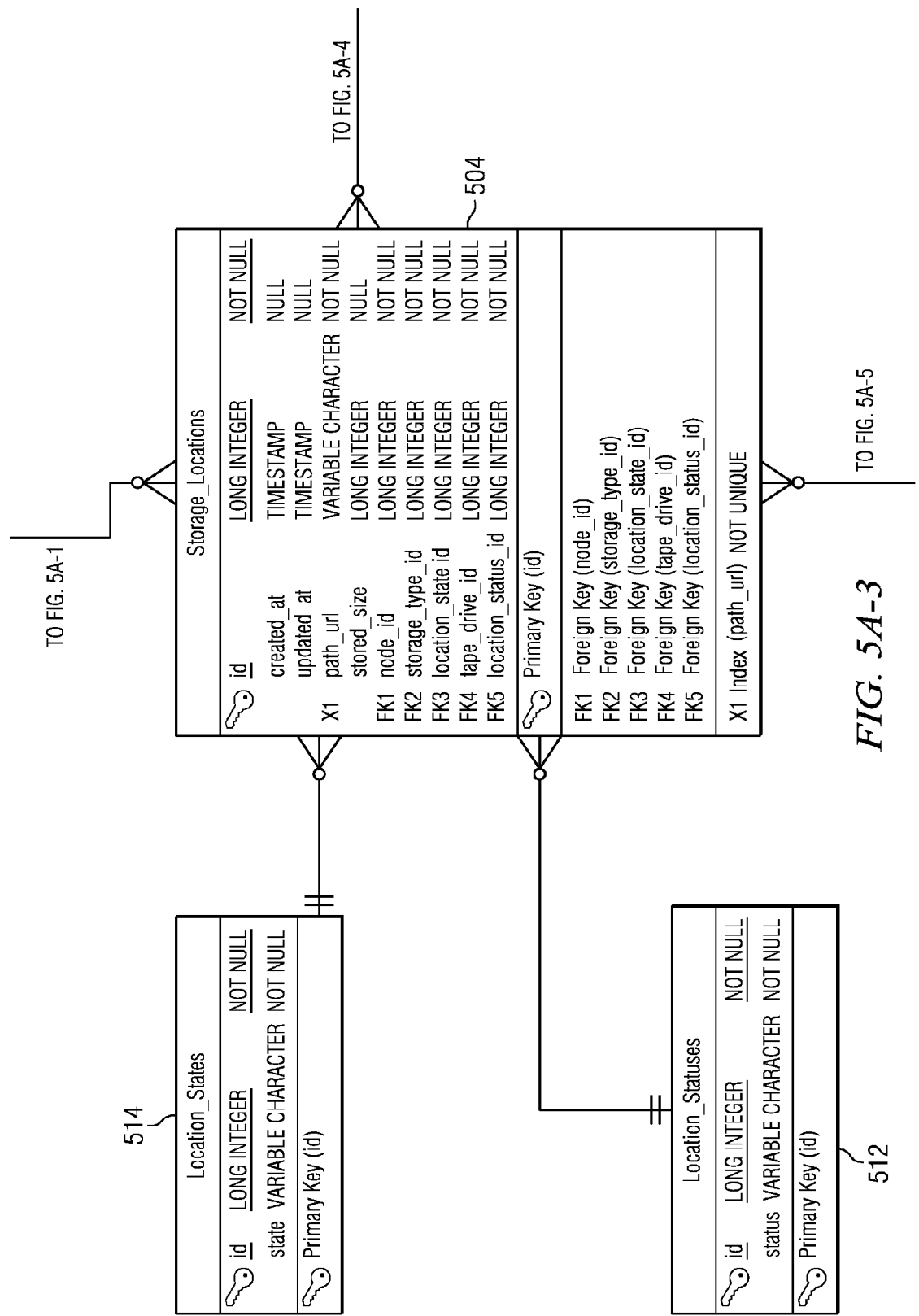

Turning first to FIG. 5A, one embodiment of a table schema for the storage of data relating to files and directories is depicted. In this schema, there is a node table 502, a storage location table 504, a storage media table 506, a disk table 508, a storage type table 510, a location statuses table 512, a Disk to Tape File System (used to refer to embodiments of an implementation of a file system using an Archive Node, also known by the acronym DTFS) settings table 516, DTFS users table 518, DTFS groups table 520, tape drives table 522, tapes table 524 and storage method types table 526.

Storage locations table 504 may comprise information on locations where data can be stored in conjunction with an Archive Node and thus entries in the storage location table 504 may be linked to entries in the storage media table 506. Entries in storage media may, in turn, be linked to entries in the disk table 508 that are associated with a data store of the Archive Node and entries in tapes table 524 that are associated with tapes in the tape library of the Archive Node. Entries in storage locations table 504 may also be linked to entries in tape drives table 522 that are associated with drives in the tape library of the Archive Node. Entries in the storage location table 504 may also be associated with a state and a status as represented by entries in the location states table 514 or the location statuses table 512.

Nodes table 502 comprises entries which are associated with a file or a directory as presented by the FUSE file system. In general the top level directory used by a FUSE file system of an archive node appliance can be a universally unique identifier (UUID) associated with the archive node appliance. Examples of such an identifier include, but are not limited to, a serial number, a software license number or other unique identifier. The use of a UUID as the top level directory by archive node appliances ensures that path names to files stored by that archive node appliance will not conflict with the path names used at a second archive node appliance if the tape is transferred to the second archive node appliance.

Entries in the node table 502 are linked with entries in the DTFS users table 518 where these entries may represent users of the DTFS file system (which may be defined by an administrator, based on the network based file system implemented by the Archive Node, etc.). Each of the entries in node table 502 may also be linked with entries in the storage location table 504 such that a link between an entry in the node table 502 associated with a file or directory may be linked with one or more entries in the storage location table 504 associated with a disk or tape where that file or directory is stored.

In the case in which an archive node appliance is part of a Windows Active Directory domain, active directory does not use Unix-like user IDS and group IDs to identify users. Active directory uses strings referred to as security identifiers (SID) for this purpose. Accordingly, the DTFS user table 518 and DTFS groups table 520 may include an entry for a user group SID that links the SID to the DTFS user id and, if applicable, to the appropriate Unix user ID (UID) and group ID (GID).

Figures 5, 5A:
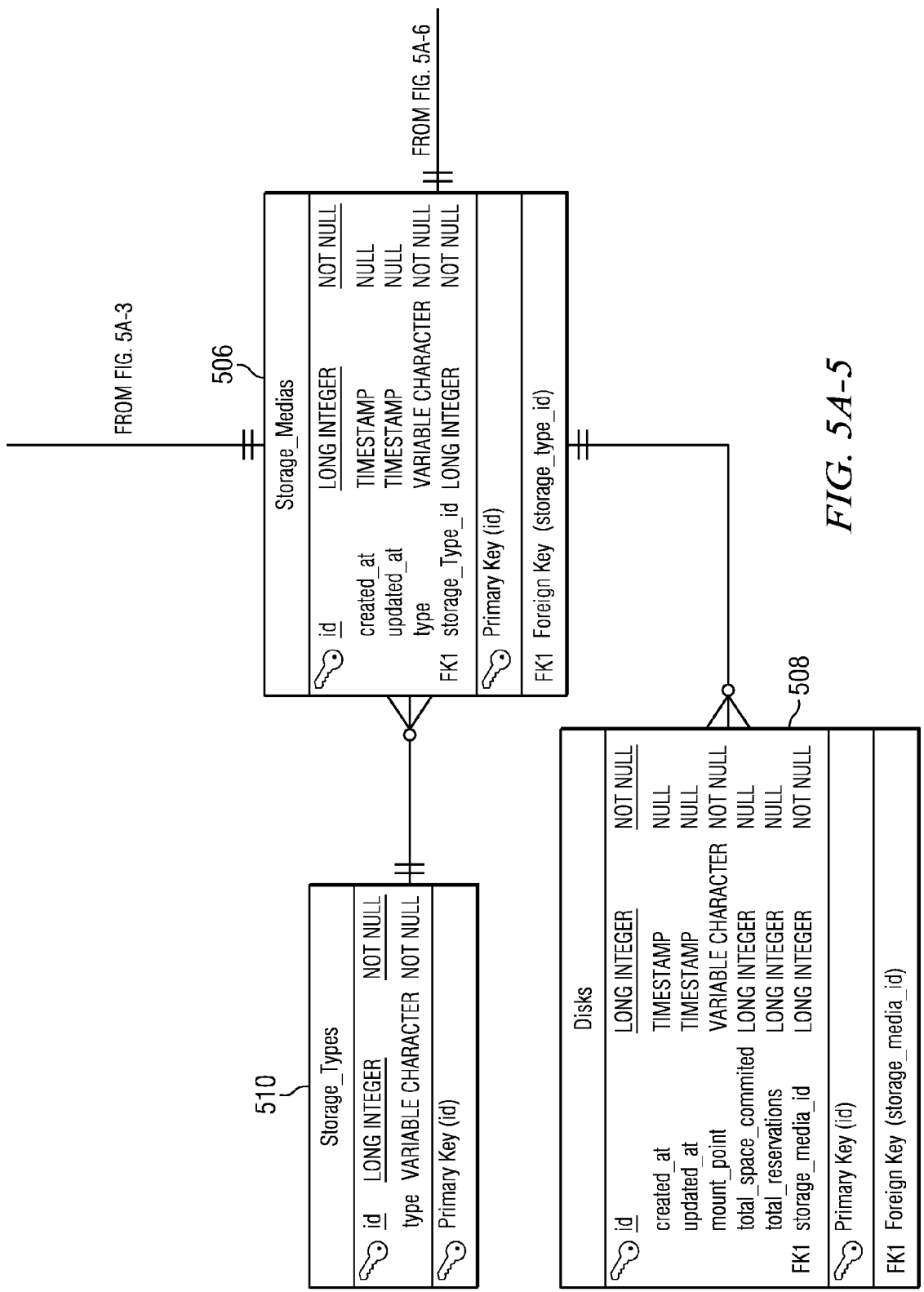
Figures 1, 5B:
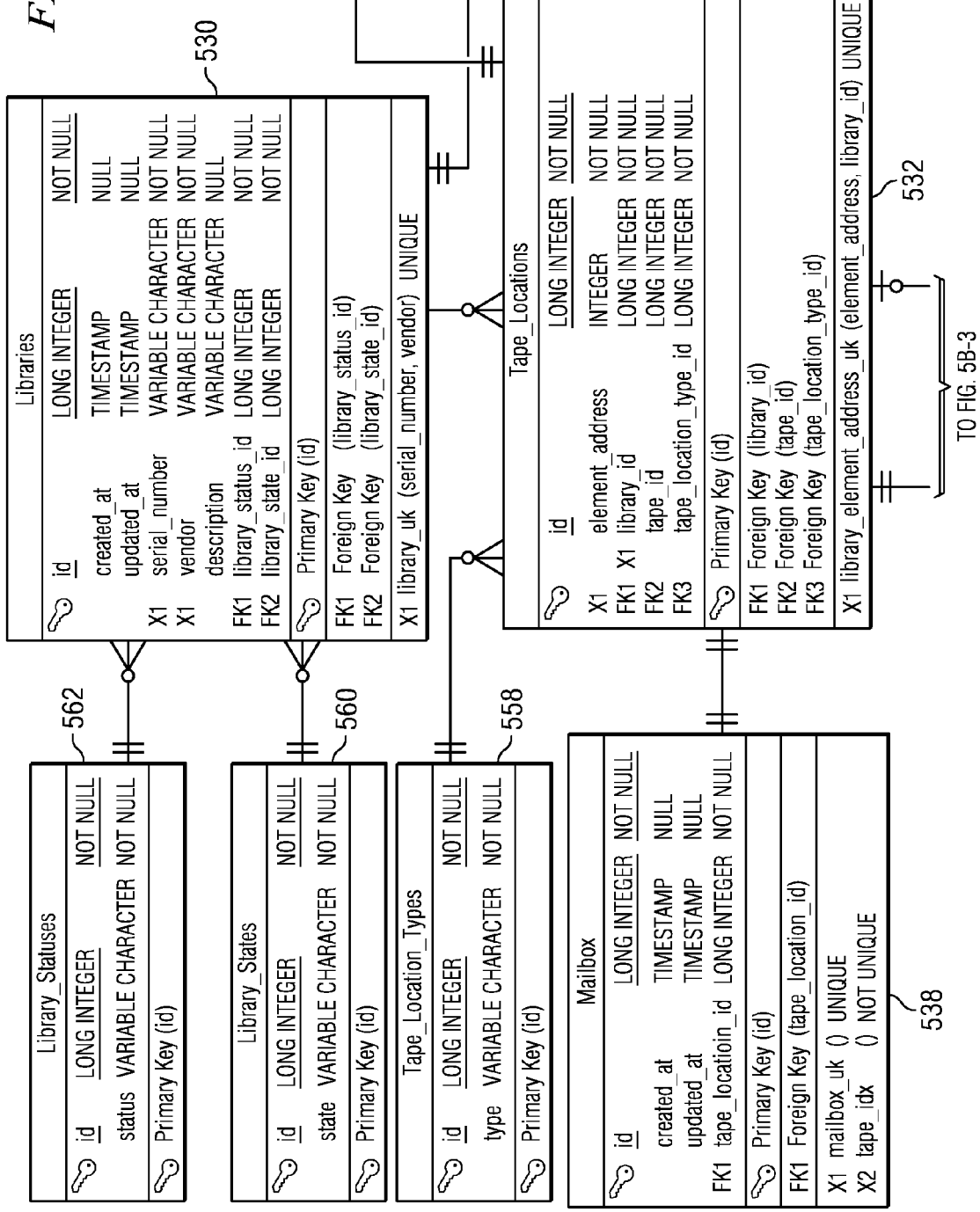
Figures 2, 5B:
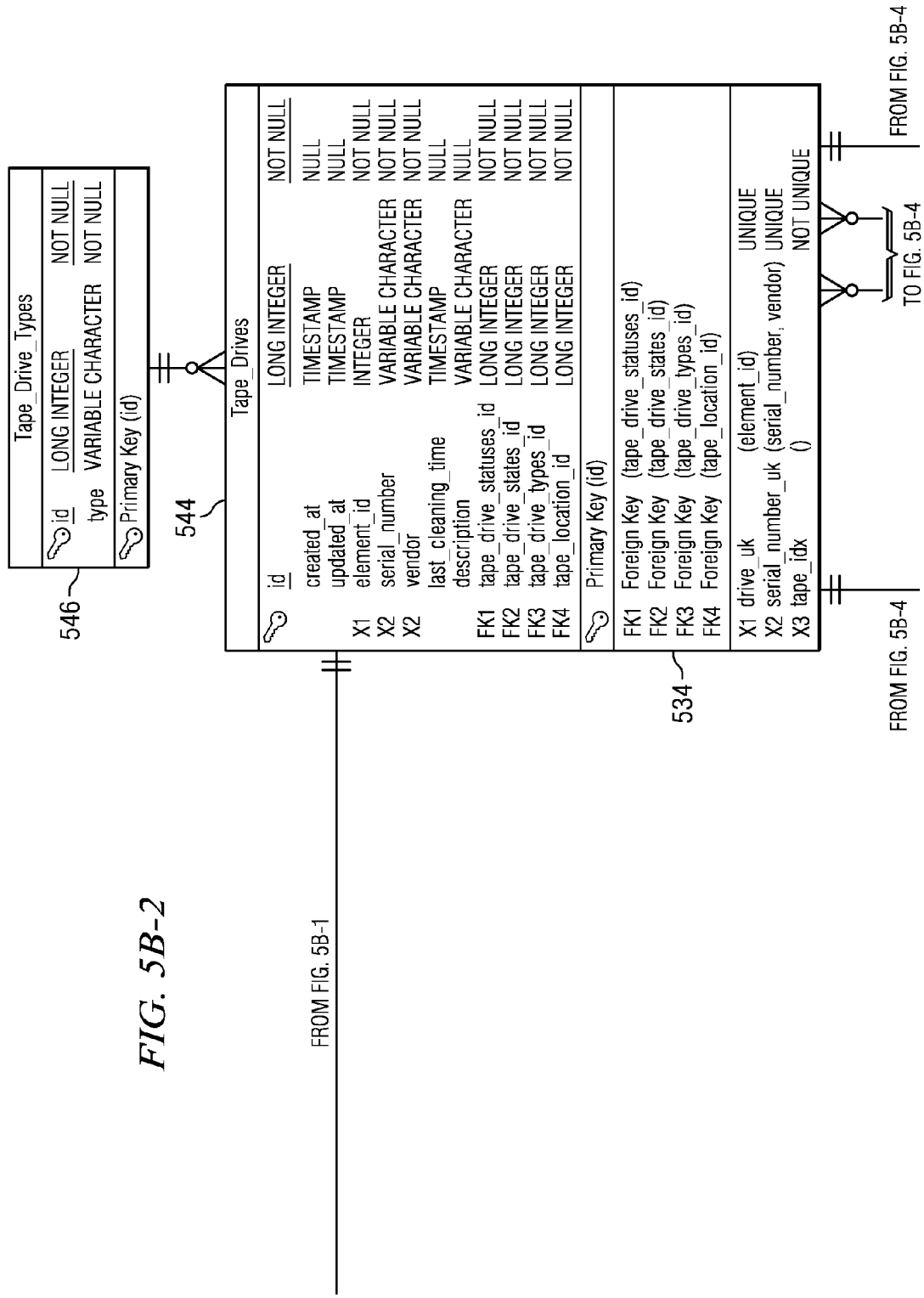
Figures 3, 5B:
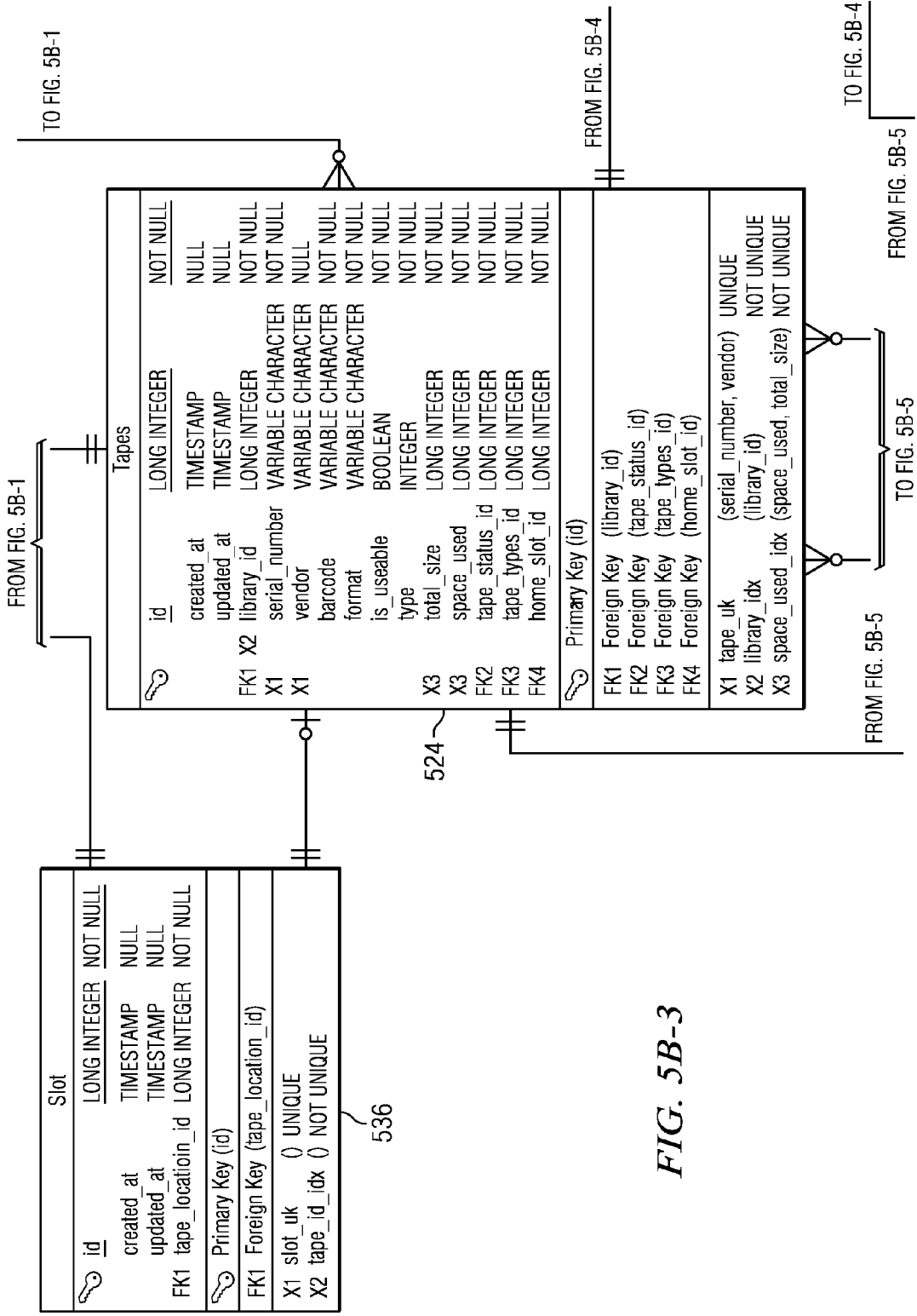
Figures 4, 5B:
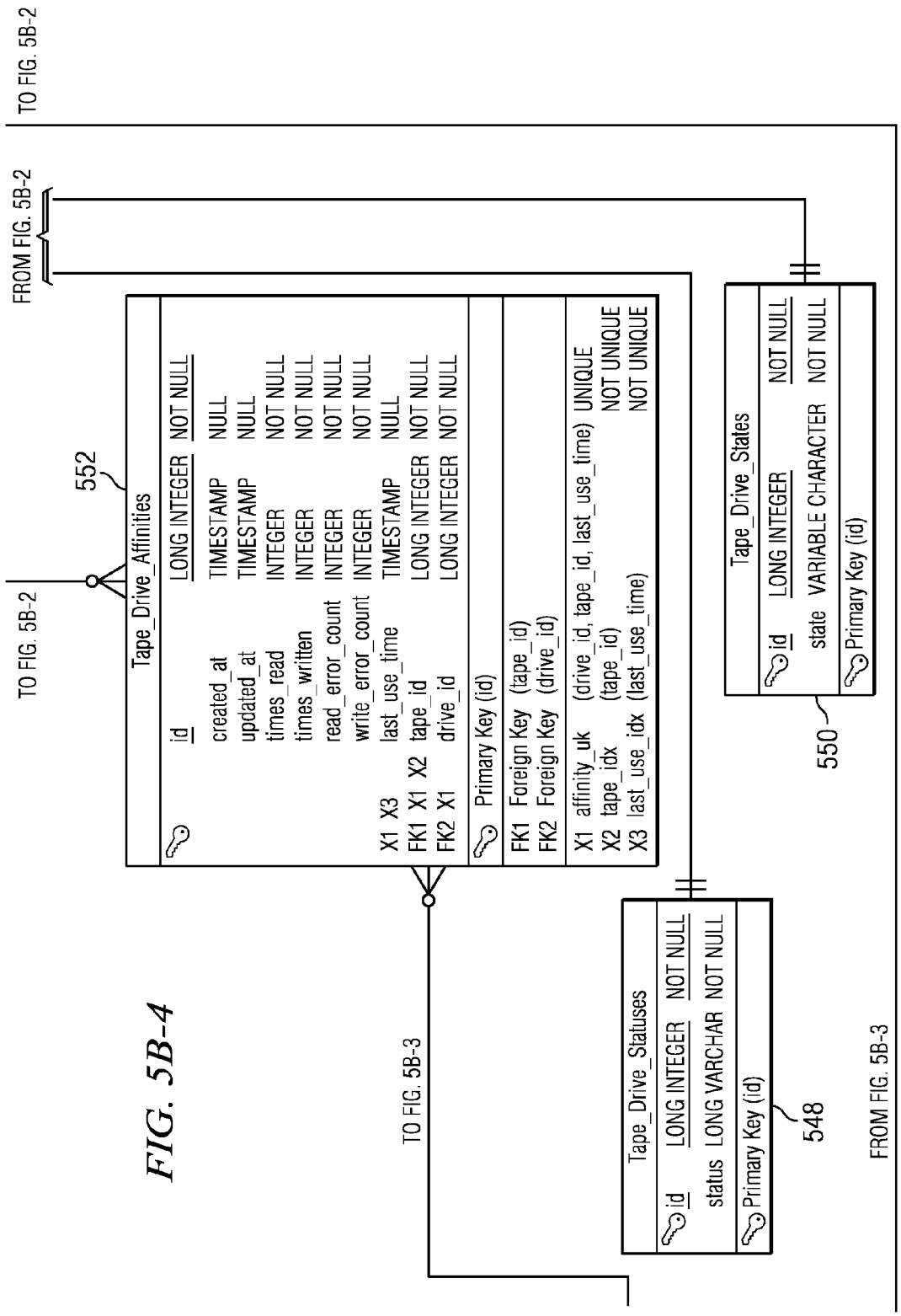
Figures 5, 5B:
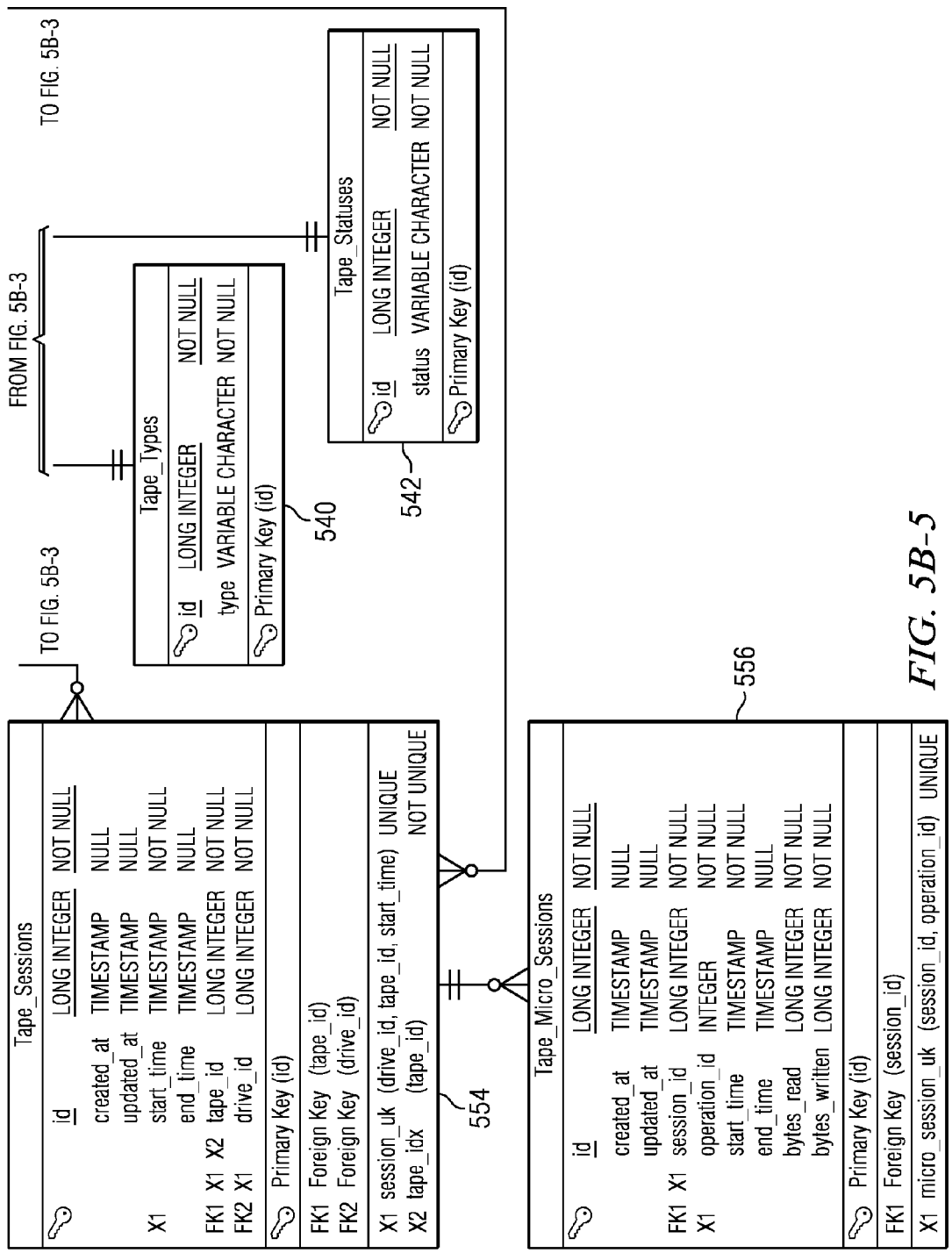

Moving now to FIG. 5B one embodiment of a table schema for the storage of data relating to tapes and tape libraries of an Archive Node is depicted. In this schema, there is a tapes table 524, tape locations table 532, libraries table 530, tape statuses table 542, tape types table 540, library statuses table 562, library states table 560, tape location types table 558, mailbox table 538, slot table 536, tape sessions table 554, tape micro sessions table 556, tape drive types table 546, tape drives table 534, tape drive affinities table 552, tape drive statues table 548 and tape drive states table 550.

Entries in tapes table 524 may be associated with an entry in tape locations table 532 associated with a location of tape in a tape library (for example, a slot, drive, etc.). Each of the entries in tape location table 532 may be associated with an entry in slot table 536 associated with a slot in a tape library or an entry in tape drives table 544 associated with a drive in the tape library. Furthermore, entries in tape locations table 532 and tapes table 524 are linked with an entry in libraries table 530 associated with a tape library of the Archive Node (of which there may be one or more, as discussed above). In this manner, an entry in tapes table 524 associated with a tape can be associated with an entry in library table 530, slot table 536 or tape drive table 544 associated with the location of that tape.

Entries in tape drive table 544 may be also linked to an entry in tape drive types table 546 associated with a type of the drive, or an entry in tape drive statuses table 548 or tape drive states table 550 associated with a status or state of a tape drive. Entries in tapes table 524 may also be linked to entries in tape status table 542 and tape types table 540 associated with a type or a status of a tape.

Figures 2, 5C:
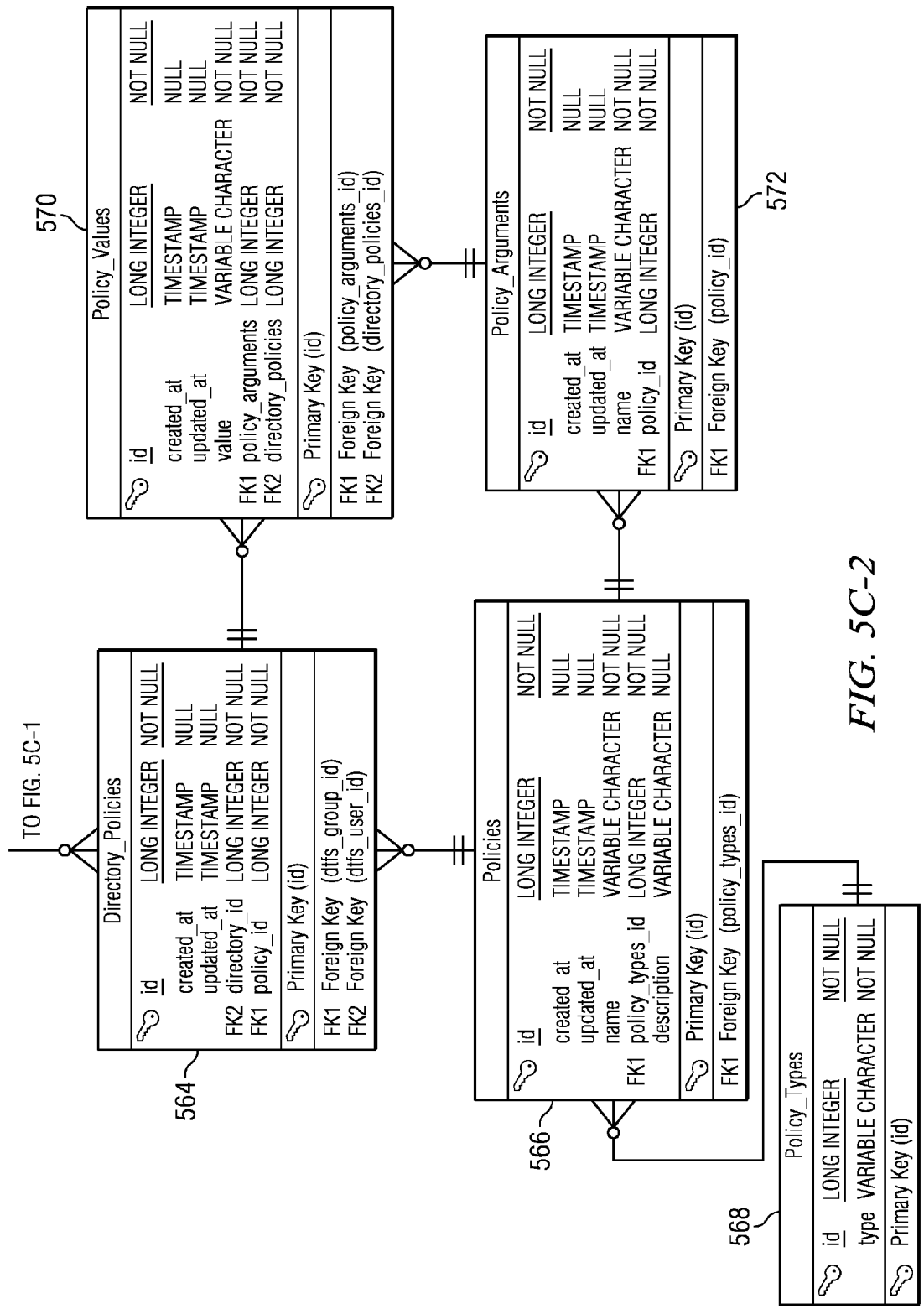

Turning to FIG. 5C one embodiment of a table schema for the storage of data relating to policies applicable to directories in an Archive Node is depicted. In this schema, there is nodes table 502, directory policies table 564, policies table 566, policy types table 568, policy values table 570 and policy arguments table 572. Entries in directory policies table 564 may be associated with polices to be applied to directories (and thus to files stored in those directories). Entries in directory policies table 564 may be linked to entries in node table 502 associated with a directory. In this manner, entries in directory policies table 564 associated with policies to be applied to directories may be linked to entries in nodes table 502 associated with a directory against which that policy is to be applied. It will be noted that a similar schema could be utilized to associate file policies with files, share policies with shares, etc.

Entries in directory policies table 564 may also be linked to an entry in policies table 566 that may be associated with a particular policy. Entries in policies table 566 may, in turn, be linked with an entry in policy types table 568 that is associated with a type of policy (for example, encryption or compression policy, number of copies to keep, replication, etc.). Thus, an entry in policies table 566 associated with a particular policy may be linked with an entry in policy type table 568 associated with the type of that policy.

Figure 5D:
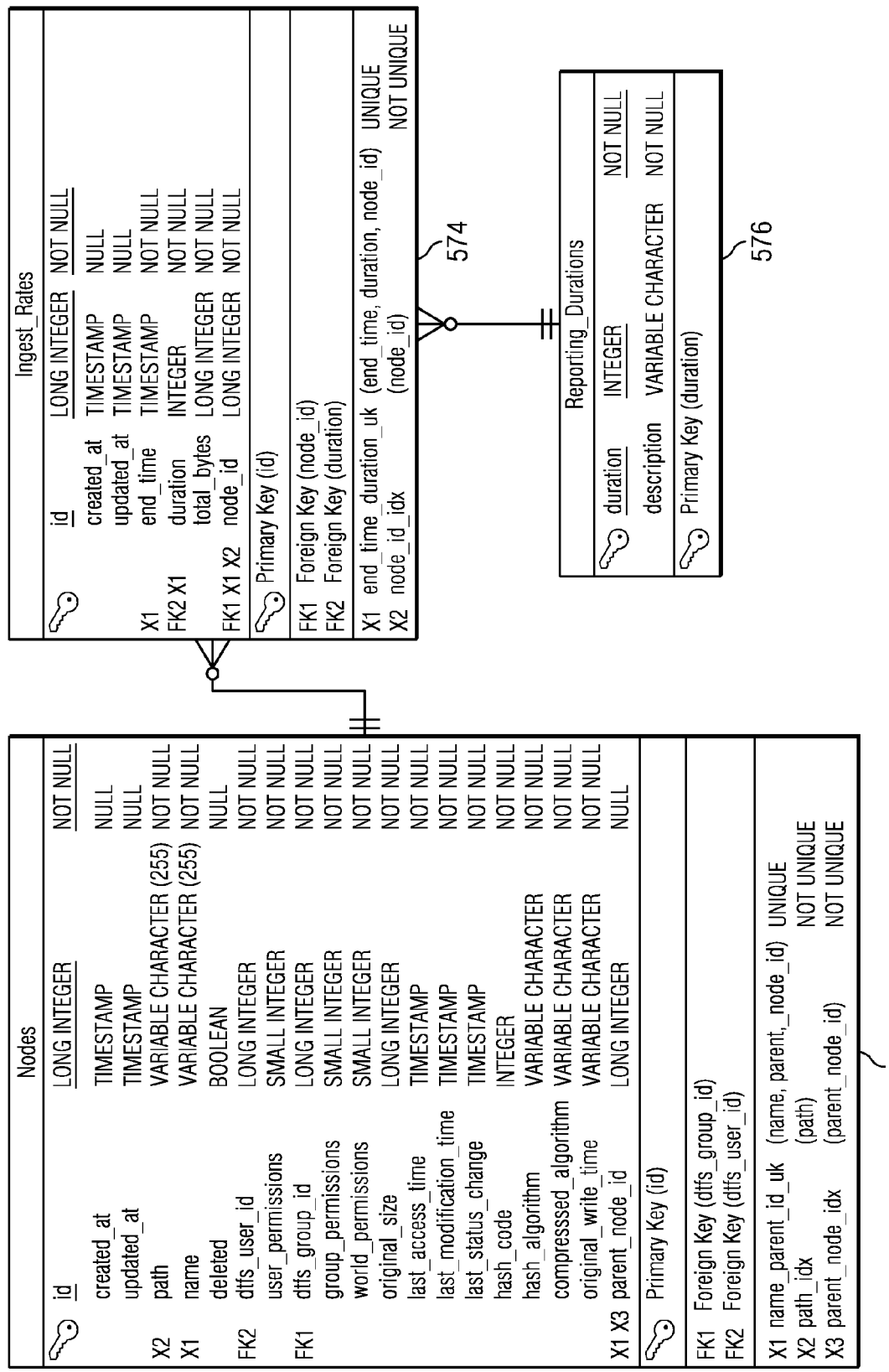

FIG. 5D depicts one embodiment of a table schema for collecting data on nodes in an Archive Node. In this schema, there is nodes table 502, ingest rates table 574 and reporting durations table 576. Thus, entries in the node table 502 can be linked to entries in ingest rates table 574 associated with statistics on the creation, reception, storage, migration, etc. of a file or directory.

FIG. 5 is provided by way of example and not limitation and the archive node appliance may store other metadata for files, directories, users, etc. According to one embodiment, for example, the FUSE file system may support extended attributes that are not used directly by the FUSE file system, but can be stored by clients and exposed through the FUSE file system. Extended attributes for a file or directory may be stored in the node table 502 for the file or directory other table. For example, a media management system may organize files based on the type of project with which the media is associated and therefore include an extended attributes such as project:soundtrack for files.

From a review of the above, it will be apparent that embodiments of such Archive Nodes may provide a highly effective manner of implementing a network based file system using a tape library. In some instances, however, it may be desired to provide a high level of availability or increased performance in conjunction with network based file systems. As such, in certain embodiments Archive Node Appliances may be clustered to provide increased performance or a higher degree of fault tolerance.

Figure 6:
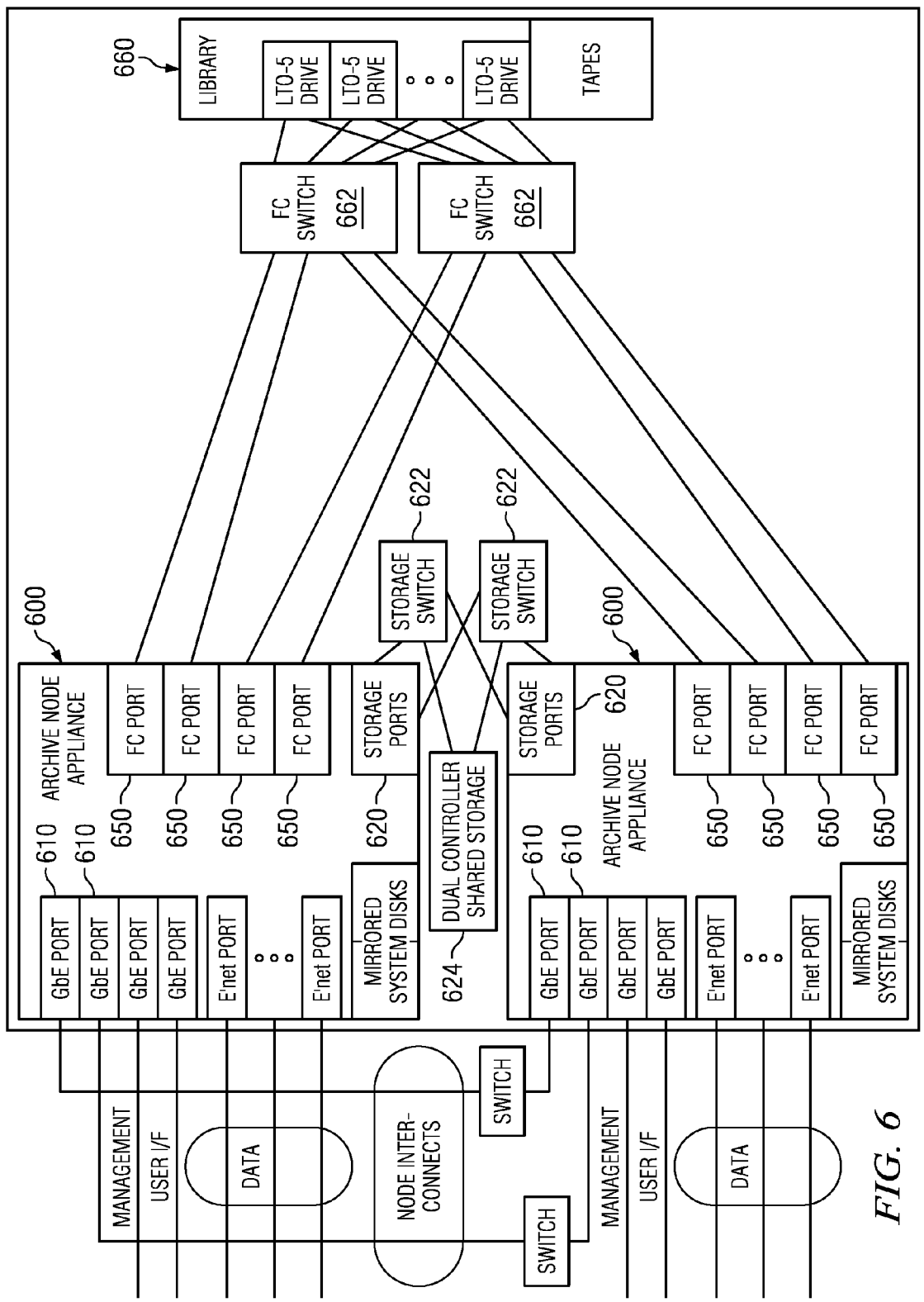
FIG. 6 is a flow chart illustrating one embodiment of a method for storing a file.

FIG. 6 depicts one embodiment of an architecture for the clustering of two Archive Node Appliances in an Archive Node. Each of Archive Node Appliances 600 may comprise similar elements as discussed above with respect to the embodiments of an Archive Node Appliance depicted in FIG. 2, 3 or 4 and thus those elements will not be elaborated on further with respect to this embodiment. In addition, Archive Node Appliance 600 may comprise Gigabit Ethernet ports 610 through which the Archive Node Appliances 600 may be coupled. Thus, Archive Node Appliances 600 may pass data between themselves during operation using Gigabit Ethernet ports 610. For example, heartbeat messages may be sent to another Archive Node 600 using the coupling between them to inform the other Archive Node 600 that the sending Archive Node 600 is still functioning.

Each Archive Node Appliance 600 may also comprise storage ports 620 through which the Archive Node Appliance may be coupled to each of storage switches 622. Each storage switch 622 is coupled to shared storage 624, such as a disk or the like, which may be accessed using dual controllers. Archive Node Appliance 600 also comprises fibre channel ports 650 through which the Archive Node Appliance 600 is coupled to a tape library 660 via a fibre channel switch 662. More specifically, half of an Archive Node Appliance's fibre channel ports 650 may be coupled to one fibre channel switch 662 while the other half of the Archive Node Appliance's fibre channel ports 650 may be coupled to another fibre channel switch 662.

Shared storage 624 may be used to store data used for operation of the Archive Node, including for example, the files as stored over the network based file system presented by the Archive Node 600, a map, an index, policies, a read cache or a file cache as discussed above. Thus, each Archive Node Appliance 600 can access any file on the shared storage 624 or tape in the library 660, and further has access to data need to implement the network based file system utilizing the tape library 660. As such, a performance increase is achieved (as, for example, there may be twice as many ports over which to receive commands from hosts, etc.) while simultaneously providing some degree of fault tolerance by providing recovery, or less downtime, from loss of a connection of an Archive Node Appliance 600, failure of an Archive Node Appliance 600, failure of the link between an Archive Node Appliance 600 and the data store, failure of a fibre channel switch, etc. It should be noted that while this embodiment of a clustered Archive Node is depicted with two Archive Node Appliances 600 and a single tape library 660, more Archive Node Appliances or media libraries may be utilized in other embodiments of a clustered Archive Node.

Figure 7:
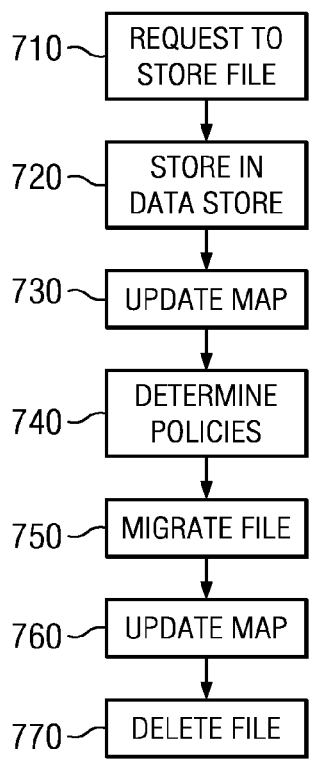
FIG. 7 is a flow chart illustrating one embodiment of a method for storing metadata of one file system on a tape using another file system.

Referring now to FIG. 7, a method for storing a file using an embodiment of an Archive Node, including an Archive Node Appliance is depicted. At step 710 a request (which may comprise multiple commands in a file system protocol) to store a file may be received at the Archive Node Appliance, where the file may be associated with a name and a path as visible through the network based file system implemented by the Archive Node Appliance. For example, the path of the file may be path /patient_records and the file name may be Patient1.doc. The file is then stored on a location on the data store of the Archive Node Appliance at step 720, where the file may have a different name and be located at a path associated with the data store. For example, the path of the file as stored on the data store may be /data3 and the file name may be 550e8400-e29b-41d4-a716-446655440000.

In one embodiment, as discussed above, the file is stored in the data store according to one or more policies that apply to that file. For example, if a policy that applies to the file (for example, the policy is associated with the location associated with the network based file system where the file is stored) specifies that the file should be compressed the file may be compressed before the file is stored in the data store. Similarly, if an applicable policy specifies that the file is to be encrypted the file may be encrypted before it is stored in the data store.

The map can then be updated at step 730 to associate the name and the path of the file as visible through the network based file system with the path and name of the file as stored on the data store. Thus, in this example the path /patient_records and file name Patient1.doc, as visible through the network based file system is associated with the path /data3 and file name 550e8400-e29b-41d4-a716-446655440000 associated with the file as stored in the data store.

Subsequently, one or more policies to be applied to the file can be determined at step 740. The policies may be applied in conjunction with the migration of the file at step 750. As discussed above, in one embodiment one policy may specify that a migration timeout period is to be applied to the file before the file is migrated. This migration timeout period may specify a time period such that an amount of time equal to the migration timeout period may be allowed to elapse before the file is migrated. Thus, if such a policy exists the migration timeout period may be allowed to elapse before the file is migrated.

In instances where the file was received from another Archive Node (e.g., in an embodiment where the Archive Node is being used in a clustered architecture) as part of a replication of that file, however, even if a policy specifying a migration timeout period applies to the file the file may be migrated substantially immediately (as the migration timeout period may, for example, have been allowed to elapsed elapse in conjunction with the migration of the file at another Archive Node Appliance in the cluster, such as the Archive Node Appliance from which the file was received).

To migrate the file, one or more tapes on which to store the file may be determined. This determination may be based on the policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of AN02394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, the path /patient_records may be created on the tape having TapeID AN02394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the Archive Node Appliance can cause the file to be stored on a compressed tape. Similarly, if an applicable policy specifies that the file is to be encrypted the Archive Node Appliance can cause the file to be stored on an encrypted tape.

The map can then be updated at step 760 to associate the tape on which the file is stored, the name and the path of the file as visible through the network based file system, the path and name of the file as stored in the data store and the path and name of the file as stored on the tape. Thus, in this example the path /patient_records and file name Patient1.doc, as visible through the network based file system is associated with TapeID AN02394, the path /data3 and the file name 550e8400-e29b-41d4-a716-446655440000 associated with the file as stored in the data store.

At step 770 the file, or portions thereof, may be deleted from the data store. In some embodiments, as it is desired to maintain the first portion of a file in a read cache in the data store, all portions of the file except this first portion may be deleted from the data store. It will be noted therefore, that in certain embodiments, the path and name of the file in the map that is associated with the file as stored in the data store may describe the location of the first portion of the file stored in the read cache.

Figure 8:
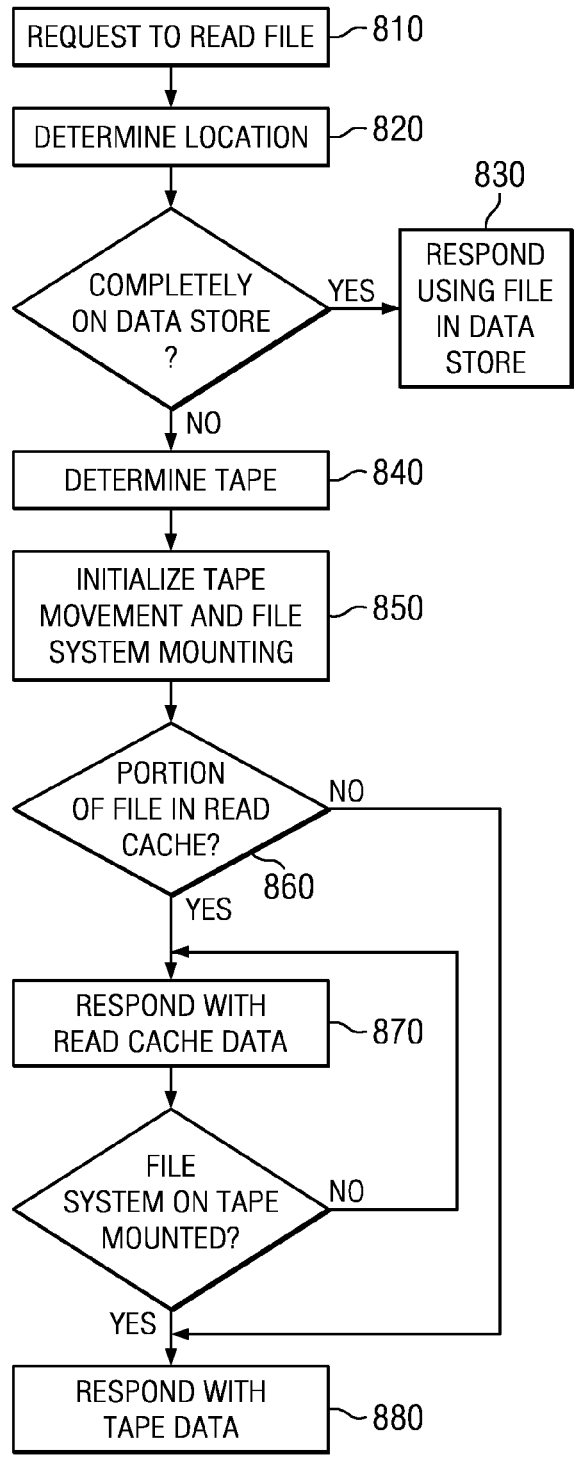
FIG. 8 is a flow chart illustrating one embodiment of data stored on a tape.

FIG. 8 depicts one embodiment of a method for reading a file using an embodiment of an Archive Node, including an Archive Node Appliance is depicted. At step 810 a request to read a file is received. This request may comprise multiple commands in a file system protocol as discussed above. The location of the file can be determined at step 820, where the file may be located in the data store of the Archive Node Appliance, on a tape in the tape library or both. If the requested file is completely on the data store at step 830 the read may be responded to using the file as stored in the data store. The file may be completely on the data store for a variety of reasons, for example, the file has been stored on the data store, but a migration timeout period associated with the file has not yet expired and thus the file has not yet been migrated; the file has been migrated but has not been deleted; the file was previously migrated and at least portions of the file deleted, but was previously read and placed in the file cache on the data store; etc.

If the file is not completely in the data store, the tape on which the file is located may be determined at step 840. The movement of the tape into a drive, if needed, and the mounting of the file system on the tape may be initiated at step 850. It can then be determined if the first portion of the file is in the read cache at step 860. If the first portion is in the read cache it may be used to respond to the read request at step 870. When the file system on the tape is mounted the file on the tape may be read and used to respond to the request at step 880. In one embodiment, when responding to the read request using the file on the tape, the file may be read into a buffer and data from the buffer used to respond to the request. In addition to reading the file into the buffer the file may also be read into file cache on the data store. If data from the file is requested at less than a threshold rate, at some point data from the file cache may be used to respond to the request for the file. Furthermore, as discussed above, the file in the file cache may be used to respond to subsequent read requests for the file.

Figure 9:
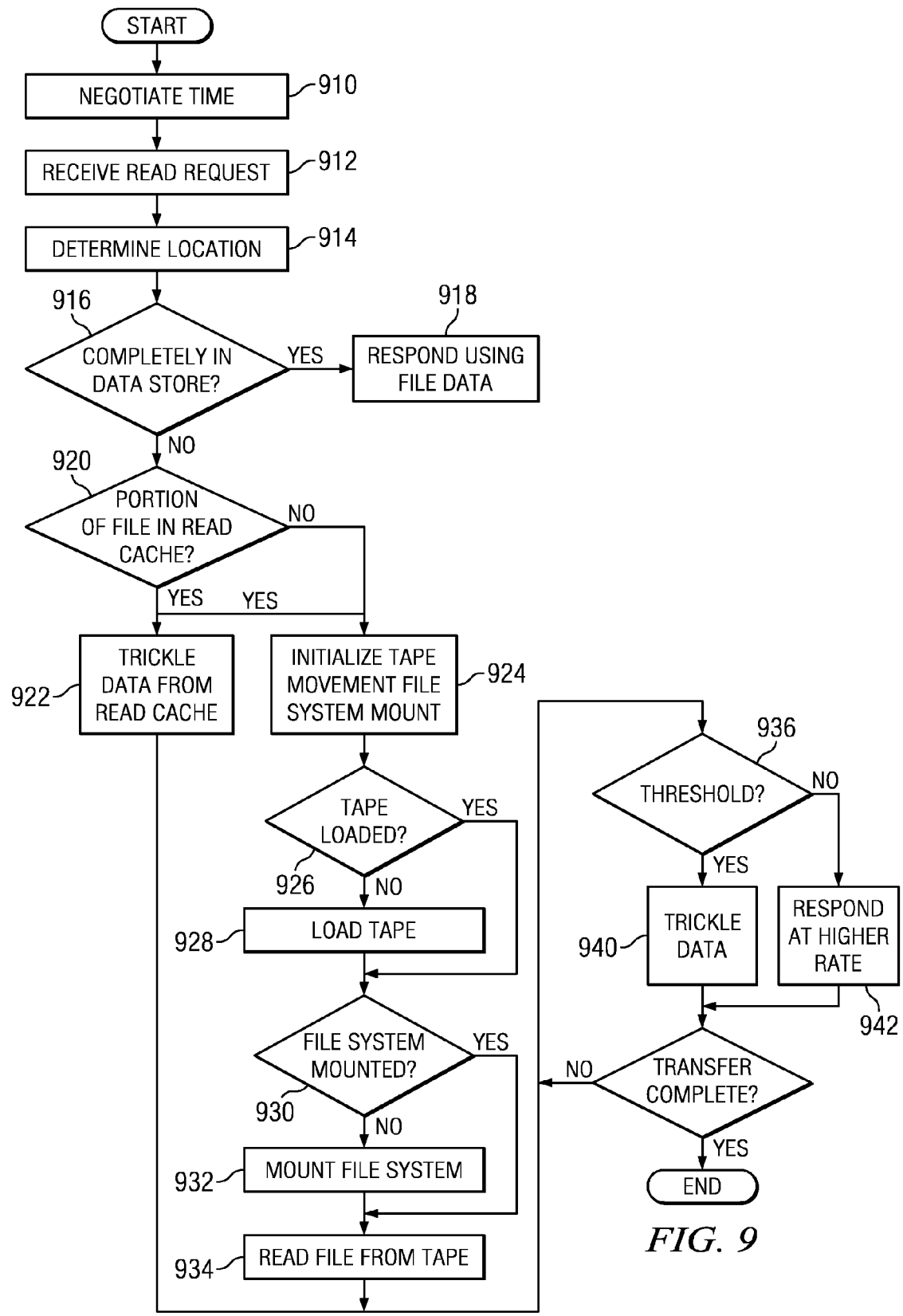
FIG. 9 is a flow chart illustrating another embodiment of storing metadata of one file system on a tape using another file system.

FIG. 9 depicts an example for delivering data in response to read requests made through the network file system interface. The process may begin when a host contacts the Archive Node Appliance to request a particular file located on a tape. At step 910, a set time for a timeout may be negotiated between a host and the Archive Node Appliance. In one embodiment, this may be the set at 30 seconds for CIFS file system and may be configurable at the Archive Node Appliance. At step 912, a read request may be received by the Archive Node Appliance from a host for a file located on a particular tape. In response to the read request, at step 914, the Archive Appliance Node may determine the location of the requested file. A determination may be made at step 916 if the file requested is completely in the data store 230. If the file is within the data store 230, then Archive Node Appliance may respond to the read request by using the file in the data store in step 918.

A determination may be made if a portion of the file is in the read cache (step 920). If a portion of the file is not within the read cache, then the Archive Node Appliance can load the file from a media. However, the time required to load the file may be long and result in a timeout.

If a portion of the file is in the read cache, then at step 922 data is "trickled" from the read cache. The rate of trickle may be selected to prevent timeout. In one embodiment, the rate of trickle may be set to be as long as possible without timing out. As one example, data may be "trickled" out from read cache 450 in 64K (or other size). If the timeout time is 30 seconds, the Archive Node Appliance can, for example, send out a response after a preselected delay of 29 seconds (or other time selected to prevent a timeout).

In general, the delay time can be selected to be less than the timeout time and in some cases can be the longest time possible that will still avoid a timeout. According to one embodiment, the delay time can be at least 50% of the time out time, though lesser delays may be used. So long as the Archive Node Appliance is in a trickle state with respect to a file, it will respond to requests for file data at a delayed rate.

As the Archive Node Appliance is trickling data to the host, the Archive Node Appliance can take steps to access the requested file from the media library (steps 924-934). While data is trickled from the read cache, a determination at step 926 may be made whether the tape is loaded. If not, the tape can be loaded in a drive (step 928). Once the tape is loaded, the file system can be mounted if necessary (steps 930 and 932.) With the file system mounted, the Archive Node Appliance reads the file data for the requested file from the tape into buffer 444 and/or file cache 460 (step 934). The Archive Node Appliance can respond to subsequent read requests for the file by sending data to the host from file cache 460 or from buffer 444.

According to one embodiment, the Archive Node Appliance can continue to respond to requests for file data until the file transfer to the host has been completed. Whether providing the file from read cache 450, buffer 444 or file cache 460, the Archive Node Appliance can throttle the speed of transfer as necessary by either trickling data or providing data to the host at a higher rate.

When the Archive Node Appliance receives a request for a chunk of file data, say the next 64K, the Archive Node Appliance can determine if there is a threshold amount of file data in buffer 444, read cache 450 and/or file cache 460 that has not yet been transferred to the requestor (step 936). If there is an insufficient amount of file data for the file requested, the Archive Node Appliance continues to trickle data to the host in response to requests for file data (step 940). If there is a sufficient amount of file data, the Archive Node Appliance responds to requests for file data without trickling (step 942). The Archive Node Appliance can continue transferring data, dynamically switching between trickling and not trickling the data based on the amount of remaining transferred data, until the file is fully transferred to the host.

According to one embodiment, the Archive Node Appliance can determine at step 936 whether the amount of untransferred file data (file data not yet transferred to the requestor) in the data store or buffer is below some threshold amount. The threshold amount can equal the capacity of the read cache for a particular file. Thus, for example, if the read cache holds 256K of data for each file, the threshold can be 256K. In this case, the Archive Node Appliance will respond with a delay to requests for the file data when the amount of untransferred file data in the data store (or buffer) drops below 256K. In other embodiments, the threshold may be set to lower or higher amounts and may be different depending on whether the remaining untransferred data is in buffer 444 or file cache 460.

In the case where the amount of untransferred data is below the threshold, but the remaining untransferred data is the last of the file data that needs to be transferred (e.g., the Archive Node Appliance is approaching the end of file), the Archive Node Appliance may continue to transfer the file data without trickling. In this case, the Archive Node Appliance does not have to slow down transfer of data for the last part of the file. Thus, whether the Archive Node Appliance trickles data may in some embodiments depend on the amount of untransferred data relative to the file size.

In the absence of other problems, such as network connectivity issues, the size of read cache 450 and the amount of delay for trickling data can determine the amount of time available to locate and read a file from a tape so that the file data can be returned to the host without timeout. For example, if a file is read in 64K blocks, the read cache is 640K for a file and the delay time is 29 seconds, the Archive Node Appliance has approximately five minutes until it must start responding with data from the media to avoid timeout (i.e., it has 4.8 minutes until the read cache is exhausted for the file). If the Archive Node Appliance is experiencing too many timeouts, the size of read cache 450 or trickle delay can be adjusted.

In some cases, the Archive Node Appliance may, when trickling data, respond with less data than requested. For example, the Archive Node Appliance may respond with 1K of data rather than the requested 64K. This provides the advantage of allowing for a smaller read cache. Using a delay time of 29 seconds and response size of 1K, rather than 64K as in the previous example, an Archive Node Appliance need only have a 10K read cache, rather than a 640K read cache, to achieve the same 4.8 minute delay.

In the examples discussed above, the Archive Node Appliance either trickles data or responds with data as quickly as possible. In other embodiments, the Archive Node Appliance may include various degrees of trickling. For example, a first threshold can be set at 640K and a second threshold can be set at 320K. If the amount of untransferred file data for the file in the data store (or buffer) is greater than 640K, the Archive Node Appliance can respond to requests for the data as quickly as possible. If the amount of data is less than or equal to 640K, but above 320K, the Archive Node Appliance can trickle data with a first delay, say 20 seconds. When the amount of data is 320K or less, the Archive Node Appliance can respond with the longest delay possible to avoid a timeout. Thus, various delays may be incorporated depending on conditions. The Archive Node Appliance can dynamically switch between responding to requests with or without a delay and the amount of delay as needed.

In one embodiment, the Archive Node Appliance may dynamically adjust the size of the read cache, the threshold(s) for trickling, the delay time or other factors based on an analysis of the average time that it takes for a file to be loaded in response to a request. In other embodiments, the Archive Node Appliance can dynamically adjust the size of the read cache, the threshold(s) for trickling, the delay time based on other statistical analysis of system performance.

As discussed above in conjunction with FIGS. 8 and 9, once the file system volume containing the file requested is mounted, data from the file can be read into a buffer and client requests can be responded to using data from the buffer. In some cases there may be multiple clients reading a file at the same time. In order to keep data flowing through the buffer, slower clients can be dropped from the buffer. Therefore, if a client cannot read the file fast enough then the requests from the client for the file are serviced from the data store, rather than the buffer, as the file is restored. If the file fails to be restored to disk, then the client can receive an error.

The operations of providing a file to multiple clients and restoring a file to the data store can occur in the context of a "tape streaming session," which allows the client, data store and tape library to operate together as the file is being read from tape. Tape streaming sessions can be implemented, for example, by I/O operations module 422 of FIG. 4. Multiple tape streaming sessions can operate in parallel when multiple files are being read from tapes of the tape library.

Figure 10:
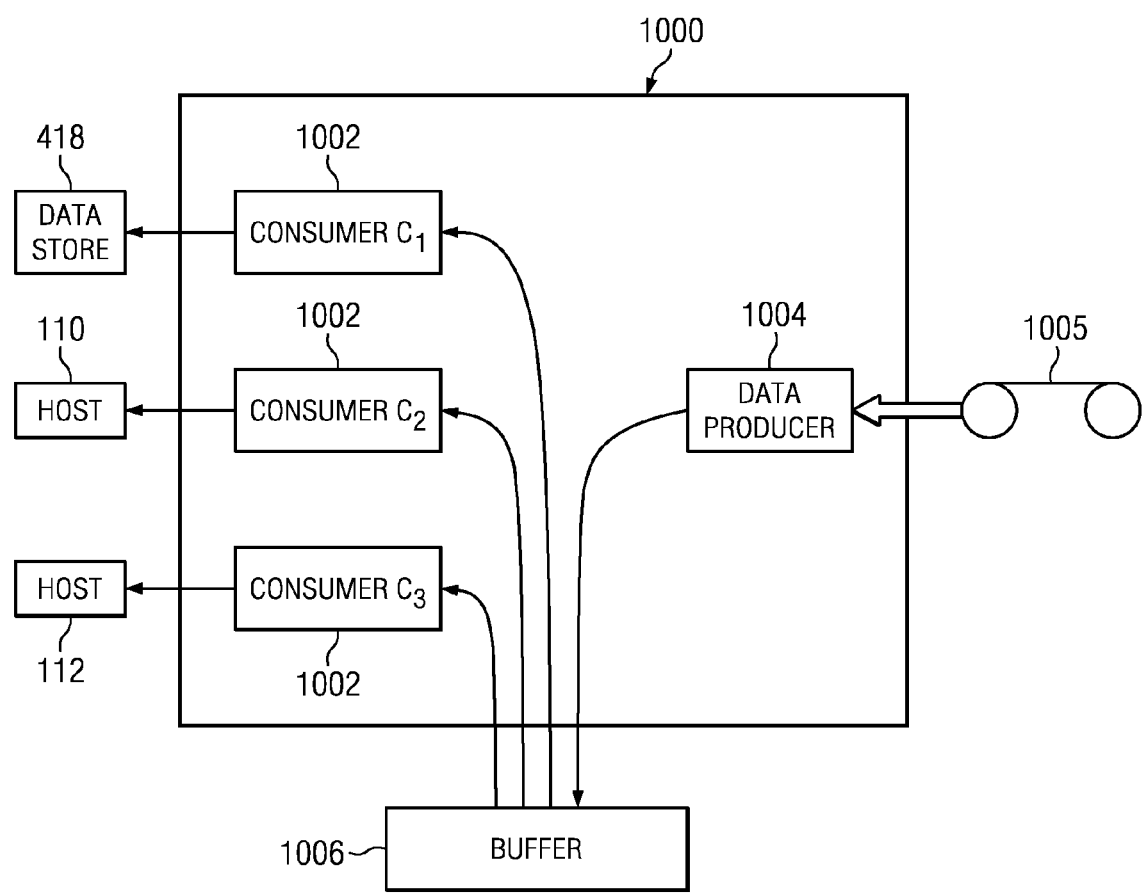
FIG. 10 is a diagrammatic representation of one embodiment of a tape streaming session.

FIG. 10 is a diagrammatic representation of one embodiment of a tape streaming session 1000. A tape streaming session can include one or more consumers 1002 and a tape data producer 1004. Tape data producer 1004 reads file data from the tape 1005 and stores the file data in buffer 1006. Consumers 1002 read file data from buffer 1006.

Each tape streaming session can include a restoration consumer dedicated to restoring the file to data store 418. For example, Consumer C1 can read data from buffer 1006 and place portions of the file not already in the data store in the read or file cache. Additional client consumers are added to the session for each "open" of the file by a file-system-interface-based client or other process or system requesting the file data. For example, if hosts 110 and 112 as network file system interface clients both "open" the file, consumers C1 and C2 can be created accordingly. According to one embodiment, the session remains in effect until all consumers 1002 of the session have been removed from the session.

Each tape streaming session can employ a tape streaming buffer 1006 in memory in which part or all of a file is stored as it is being read from the tape. When a session is initiated, a buffer size can be allocated to the session. The buffer size may be the size of the file being read, a configurable maximum size or other size. When file data is read from the tape, tape data producer 1004 stores the data in the tape streaming buffer 1006. If the total size of a file is greater than the size of buffer 1006, then buffer 1006 can act in a circular fashion such that once tape data producer 1004 reaches the end of buffer 1006, tape data producer 1004 will write additional data to the beginning of buffer 1006, over writing data from the previous wrap. This cycle can repeat until the entire file has been written to buffer 1006 by tape data producer 1004.

In operation, when a client attempts to open a file that is not completely in the data store, a session can be instantiated with a consumer 1002 for the client, a consumer 1002 for restoring the file to the data store and a data producer 1004 for storing tape data in the buffer. Initially, responses to requests by the client to read a block of data of the file can be delayed before the data is returned to the client (e.g., data can be trickled to the client as discussed above). Data is read from the read cache until the proper tape is loaded, the file system mounted and tape data producer 1004 begins filling buffer 1006 with data. If the tape volume containing the file cannot be mounted before the data client reads all the data in the read cache, an error can be returned to allow tape data producer 1004 time to begin filling buffer 1006 within a configurable timeout period.

As soon as data begins filling buffer 1006 or some threshold amount of data is in buffer 1006, a client's read requests can be fulfilled by the corresponding consumer 1002. New consumers 1002 may be added to tape session 1000 as additional clients request to "open" the file. However, according to one embodiment, consumers 1002 will only be added within defined portions of the tape streaming session. For example, according to one rule, a consumer 1002 will not be added if the client "opens" the file after a portion of the file data has already been flushed from the buffer (e.g., the tape data producer 1004 has "wrapped around"). In other embodiments, consumers can be added to the tape session for any client that requested to "open" the file and is issuing read requests for data that is still in buffer 1006.

To maintain data flowing through buffer 1006, and thus being continuously read from tape 1005, lagging consumers 1002 can be expelled from tape streaming session 1000. In general, a lagging consumer is one identified as reading data too slowly from buffer 1006 according to one or more rules. In one example, a lagging consumer is one that is reading data from positions in buffer 1006 that risk being overwritten by producer 1004.

Figure 11:
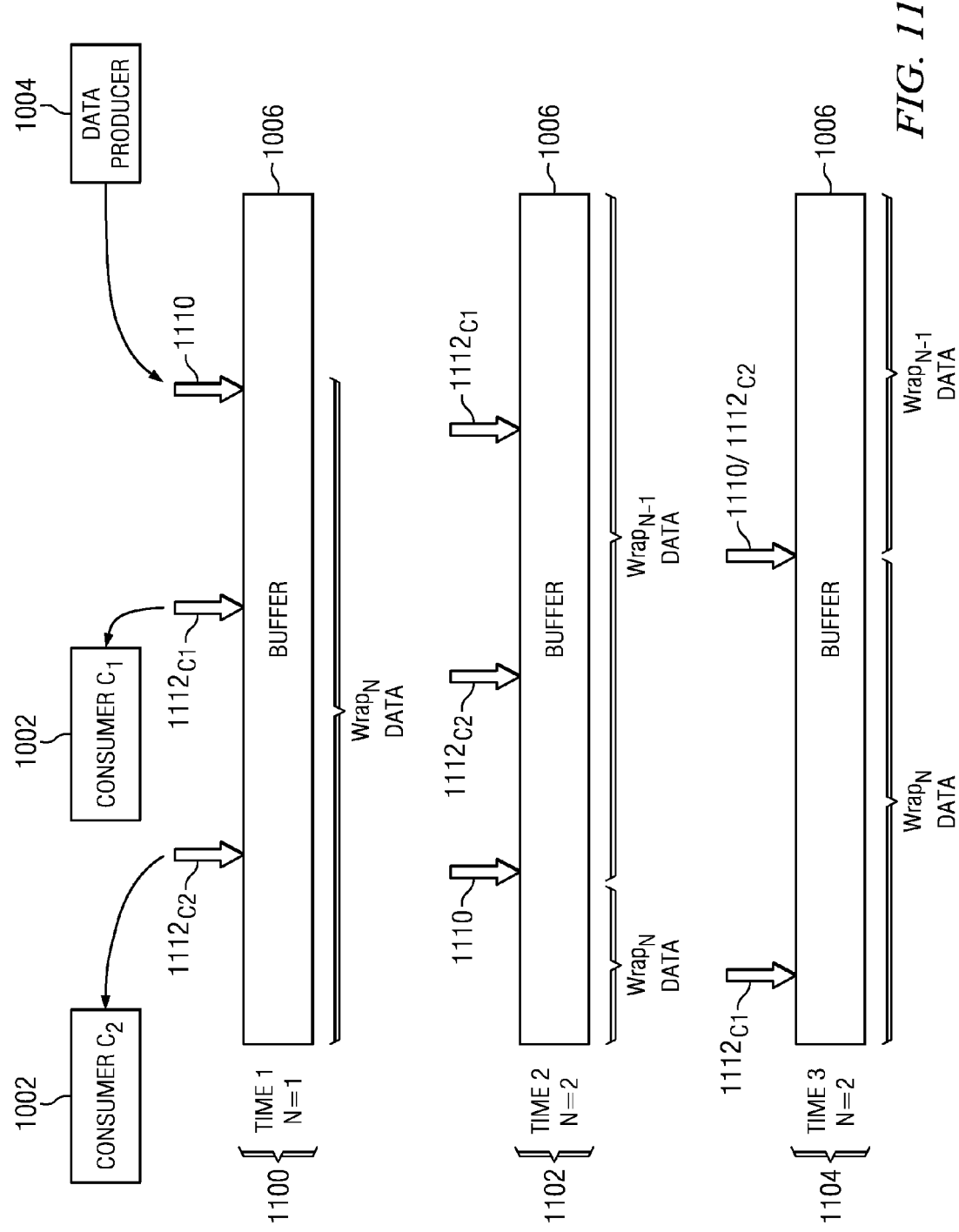
FIG. 11 is diagrammatic representation of various states of an embodiment of writing to and reading from a buffer.

One scenario in which a lagging consumer can be expelled from a session can be better understood with respect to FIG. 11, which provides a diagrammatic representation of various states of writing to and reading from buffer 1006 at time periods 1100, 1102 and 1104. In the embodiment of FIG. 11, tape data producer 1004 is writing data into buffer 1006 and consumers 1002 C1 and C2 are reading data from buffer 1006. Position 1110 indicates the position to which tape data producer 1004 has most recently written data, position 1112C1 indicates the last position from which consumer C1 has read data and position 1112C2 indicates the last position from which consumer C2 has read data.

At first time 1100, tape data producer 1004 is filling buffer 1006 for a first wrap (N=1), but has not reached the end, and consumers C1 and C2 are reading from buffer 1006. Tape data producer 1004 can continue to fill the buffer as quickly as possible. At second time 1102, tape data producer 1004 has filled buffer 1006 and wrapped around to begin over-writing data at the beginning of buffer 1006 with new data corresponding to the second wrap N=2 (e.g., because the file being read is larger than buffer 1006). At this point, consumer C1 and C2 are still reading data from the previous wrap (N−1), but more slowly than producer 1004 is writing data for the next wrap. At third time 1104, tape data producer 1004 has caught up to consumer C2.

If tape data producer 1004 overwrites data with data from wrap N−1 with data corresponding to wrap N, consumer C2 will begin reading data corresponding to the wrong file position. Therefore, data producer 1004 must either delay writing additional data or consumer C2 must stop reading data. To keep data streaming from the tape, it is preferable that consumer C2 stop reading data from buffer 1006. Consequently consumer C2 may be expelled from the session. However, if data producer 1004 catches up to consumer C1 (the file restoration consumer), consumer C1 is not expelled because it may be preferable to maintain the tape streaming session until the file is restored in the data store.

In this case, data producer 1004 may delay for a period of time to allow consumer C1 time to read more data.

The above-example assumes that consumers read data in a completely linear fashion from buffer 1006. However, file read operations sometimes require a small amount of forward seeking and back-seeking. Accordingly, one embodiment can employ a configurable "read-back" size so that a consumer is expelled from the buffer before producer 1004 overwrites data to which consumer 1002 is likely to read-back. One embodiment of using a read-back size can be better understood with reference to FIG. 12.

Figure 12:
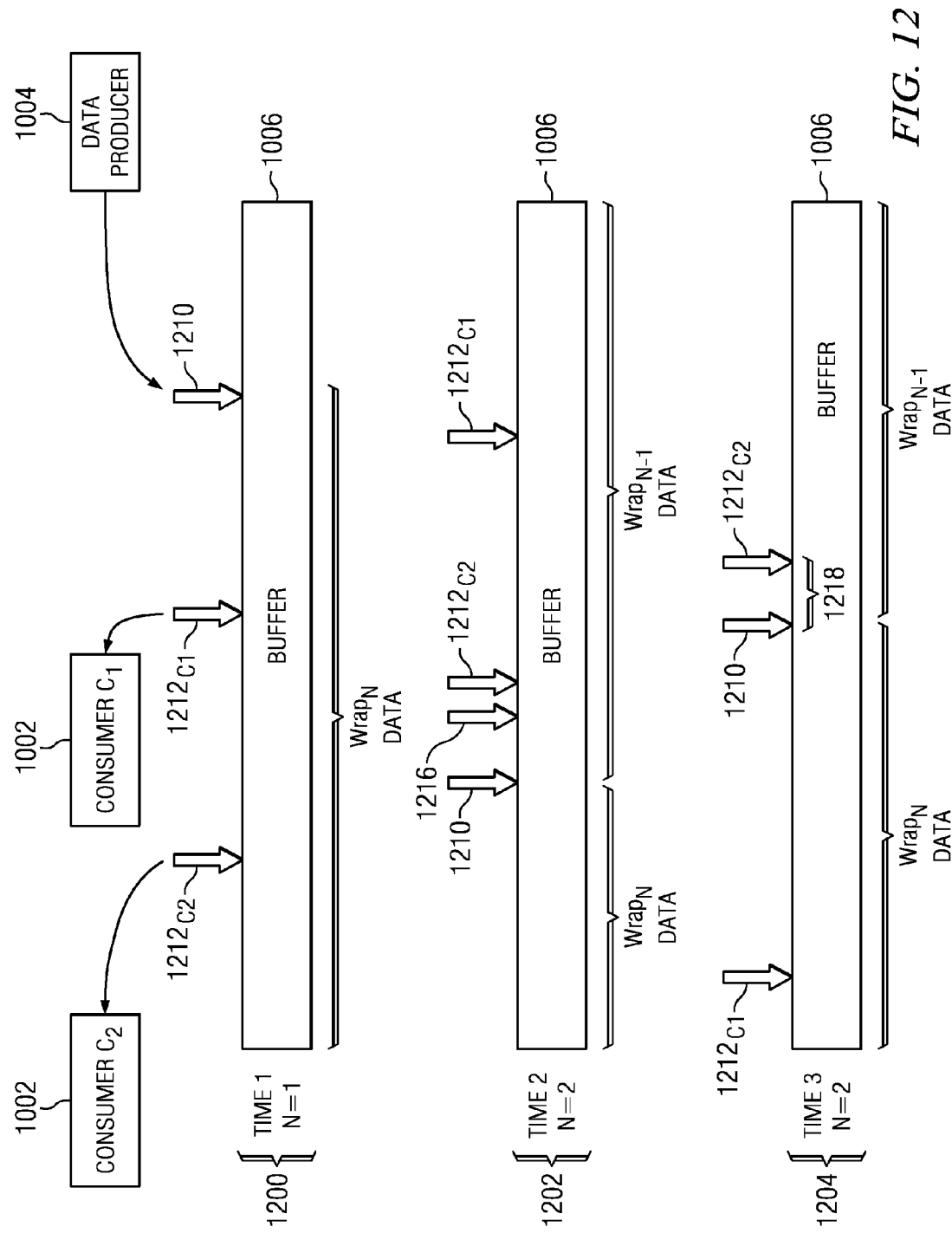
FIG. 12 is a diagrammatic representation of various states of another embodiment writing to and reading from a buffer.
Figure 14C:
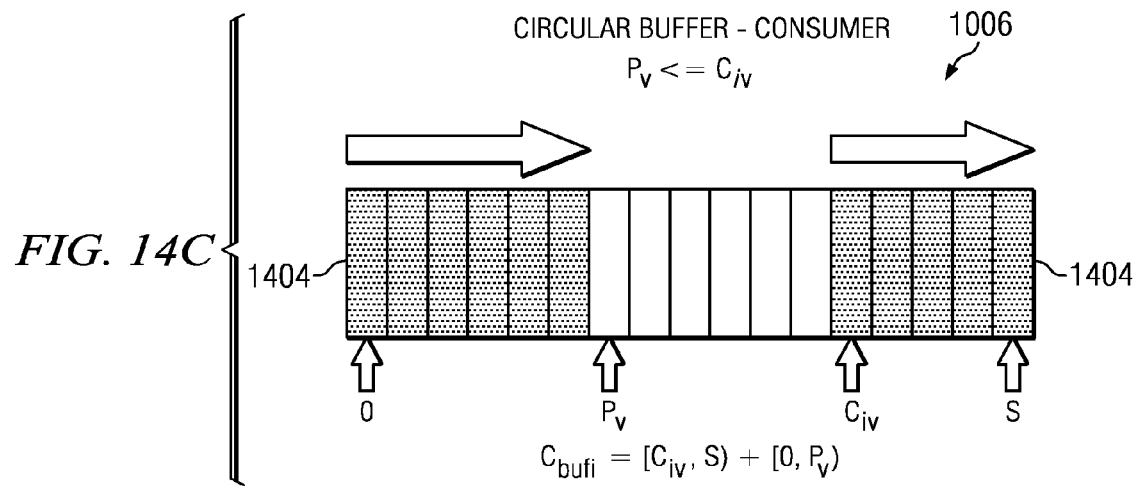
FIG. 14C is a diagrammatic representation of another embodiment of a producer virtual buffer.
Figure 14D:
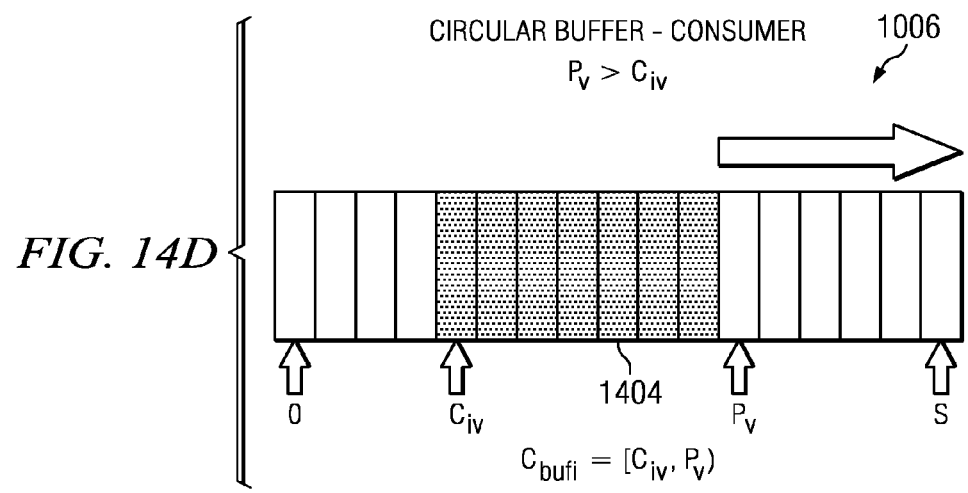
FIG. 14D is a diagrammatic representation of another embodiment of a consumer virtual buffer.

In the embodiment of FIG. 12, tape data producer 1004 is writing data into buffer 1006 and consumers C1 and C2 are reading data from buffer 1006. Position 1210 indicates the position to which tape data producer 1004 has written data, position 1212C1 indicates the last position from which consumer C1 has read data and position 1212C2 indicates the last position from which consumer C2 has read data.

At first time 1200, tape data producer 1004 is filling buffer 1006, but has not reached the end, and consumers C1 and C2 are reading from buffer 1006. Tape data producer 1004 can continue to fill the buffer as quickly as possible. At second time 1202, tape data consumer 1004 has filled buffer 1006 and wrapped around to begin over-writing data at the beginning of buffer 1006 with new data (e.g., because the file being read is larger than buffer 1006). At this point, consumer C1 and C2 are still reading data from the previous wrap.

Because read requests for consumer C2 may not be strictly linear, it is possible that the next read request may request data that is behind position 1212C2, say from position 1216. If tape data producer 1004 writes data too close to position 1212C2, then there is a high probability that consumer C2 will request data corresponding to wrap N−1 from a position that has been over-written by tape data producer 1004 with data from wrap N. To account for this non-linearity in consumer C2 reading data, a read-back size can be applied. If the writing position reached by tape data producer 1004 reaches the reading position of a consumer minus a configurable read back offset, the consumer can be expelled from the tape session.

For example, at third time 1204, tape data producer 1004 has reached the position of consumer C2 minus the read-back offset size (indicated at 1218). In this case, tape data producer 1004 must either stop writing to buffer 1006 temporarily or begin overwriting data to which consumer C2 may read-back. In order to keep data streaming into buffer 1006, consumer C2 can be expelled from the session.

In general, the scope of read-back is relatively small so that a small read-back size can be configured. In some cases, the same read-back size may be used for all consumers. In other cases, different consumers may be assigned different read-back sizes. The read-back size, in some embodiments, may be statistically determined "on the fly" for groups of consumers or individual consumers based on the reading patterns of the consumer(s).

In order to track the positions of consumers 1002 and producer 1004 in buffer 1006 and the location of file data in the buffer, a number of indices can be maintained. According to one embodiment, an "absolute" producer index is maintained for tape data producer 1004 and each an "absolute" consumer index for each consumer 1002 representing a file-pointer-style offset pointing to the last point in the file read from or written to by consumers 1002 and producer 1004, respectively. Furthermore, virtual indices are maintained for producer 1004 and consumers 1002 indicating the positions in the circular buffer corresponding to the absolute indices.

To provide some additional context, FIG. 13 is a diagrammatic representation of file positions for a file having a total size "T" being read from tape, a producer absolute index 1302 ("Pa") and consumer absolute indices 1304Ci ("Ci") and 1304Cmax ("Cmax"), with Cmax indicating the read position of the consumer 1002 that has read to the furthest absolute file position in the session. When producer 1004 writes data into buffer 1006, producer absolute index 1302 is incremented by the number of bytes that were written into buffer 1006. When a consumer 1002 reads data from buffer 1006, its absolute index is increased by the number of bytes read from the buffer.

At any given time, producer 1004 has a certain amount of space in buffer 1006 that it may write to. This amount is based on the size of buffer 1006 and how much data each consumer 1002 has read from buffer 1006. This is referred to as "space available". Likewise, each consumer 1002 has a certain amount of data that is available to be read from buffer 1006 based on how much data that consumer 1002 has read and how much data producer 1004 has written into buffer 1006. This is referred to as "data available". The data available size and space available size may be calculated as follows, where "S" is the size of buffer 1006.

$$\text{DataAvailable}(C_i) = P_a - C_i \qquad [\text{EQN. 1}]$$

$$\text{SpaceAvailable}(P_a) = S - (P_a - C_{max}) \qquad [\text{EQN. 2}]$$

The space available determination assumes that the consumer associated with $C_{max}$ will not be expelled from the session. Again $C_{max}$ will typically correspond consumers that read data from the buffer to restore files in the data store.

In order to map the linear file positions to positions in the circular buffer, virtual indices can be used. According to one embodiment, the virtual indices can be calculated as follows, where "$P_v$" is the virtual producer index, "$C_{maxv}$" is the virtual consumer index for the consumer 1002 that has read to the furthest absolute file position in the session and "$C_{iv}$" is the virtual consumer index for consumer $C_i$:

$$P_v = P_a \text{ modulo } S \qquad [\text{EQN. 3}]$$

$$C_{iv} = C_i \text{ modulo } S \qquad [\text{EQN. 4}]$$

Thus, when a client request to read data corresponding to absolute file position $C_i$, the data can be found in the circular buffer at $C_{iv}$.

The virtual indices can be used to calculate "virtual" buffers that are accessible to producer 1004 and each consumer 1002. The virtual buffers can be defined by the following intervals, where "$P_{buf}$" is the producer virtual buffer and "$C_{bufi}$" is the virtual buffer of consumer i:

$$\text{For } P_v > C_{maxv} : P_{buf} = [P_v, S) + [0, C_{maxv})$$

$$\text{For } P_v <= C_{maxv} : P_{buf} = [P_v, C_{maxv})$$

$$\text{For } P_v <= C_{iv} : C_{bufi} = [C_{iv}, S) + [0, P_v)$$

$$\text{For } P_v > C_{iv} : C_{bufi} = [C_{iv}, P_v)$$

Examples of producer virtual buffers 1402 and consumer virtual buffers 1404 for a consumer $C_i$ are illustrated in FIGS. 14A-D.

As discussed above, to keep the data flowing through the buffer (and thus being continuously read from tape) as quickly as possible, lagging consumers 1002 are expelled from the buffer 1006. According to one embodiment, a consumer 1002 is expelled when DataAvailable($C_i$)>=S, or DataAvailable($C_i$)>=S-offset. The buffer indices of expelled consumers 1002 are deleted from the tape streaming session, and the space used by the consumer's unread data is reclaimed and may be written to by tape data producer 1004.

Since not all file read operations are in a linear sequence, seeking forward and backward in tape streaming buffer 1006 may be required. If the file is smaller than buffer 1006, then all positions in the file are accessible ("seek-able") by the consumers for the life of the tape streaming session. If the file is larger than buffer 1006, only the portion of the file that is currently contained in the buffer is accessible. If a request to seek forward is beyond the amount of file data that has been written into buffer 1006 by the tape data producer 1004, then the consumer 1002 must wait until enough data has been written into buffer 1006 to fulfill the request.

The session may include a configurable "read-back" size within the buffer to support localized reverse seek requests. The client can be issued an error when attempting to seek data in a position below this reserved range. In many cases, the read-back size can be relatively small (e.g., 100 kB). In other embodiments the read-back size can be larger.

Embodiments described herein provide systems and methods of using a buffer to stream file data from mounted tape file system volumes to multiple clients. Requests to non-lagging clients can be serviced from the buffer while requests from lagging clients can be serviced from a disk cache.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for providing a network based file system, comprising:
   a memory;
   a processor;
   a non-transitory computer readable storage medium storing a set of computer program instructions, the set of computer program instructions comprising instructions executable to:
      for a request for a file either partially stored or not stored at all in a disk-based cache,
      initiate a tape reading session corresponding to the file;
      allocate a buffer in the memory for the tape reading session, wherein the buffer is a circular buffer;
      during the tape reading session:
         store file data in the buffer read from an LTFS volume;
         restore the file to the disk-based cache from the buffer;
         reply to read requests for file data of the file from non-lagging network file system interface clients associated with the tape reading session from the buffer; and
         reply to read requests for file data of the file from lagging network file system interface clients from the disk-based cache, wherein a network file system interface client was determined to be a lagging network file system interface client based on a position in the circular buffer associated with the network file system client at risk of being overwritten, the risk of being overwritten determined by a space in the circular buffer between a producer writing data in the circular buffer and the position in the circular buffer associated with the network file system interface client.

2. The system of claim 1, wherein the tape reading session comprises:
   a tape data producer configured to write file data into the buffer;
   one or more consumers configured to read data from the buffer; and
   wherein the set of computer program instructions further comprise instructions executable to expel lagging consumers from the tape reading session.

3. The system of claim 2, wherein the set of computer program instructions further comprise instructions executable to determine that a consumer is lagging if a data available size for that consumer equals a buffer size of the circular buffer.

4. The system of claim 2, wherein the set of computer program instructions further comprise instructions executable to:
   maintain an absolute producer index and virtual producer index;
   maintain an absolute consumer index for each of the one or more consumers and a virtual consumer index for each of the one or more consumers; and
   for a consumer, delete the absolute consumer index and virtual consumer index for that consumer if that consumer is expelled from the tape reading session.

5. The system of claim 4, wherein the set of computer program instructions further comprise instructions executable to map linear file positions to positions in the buffer.

6. The system of claim 2, wherein the one or more consumers comprise a file restoration consumer and one or more client consumers.

7. The system of claim 6, wherein the set of computer program instructions further comprise instructions executable to add a client consumer to the tape reading session for each network file system interface client from which an "open" command is received for the file within a defined portion of the tape reading session.

8. A computer program product comprising a non-transitory computer readable medium storing a set of computer program instructions comprising instructions executable to:
   for a request for a file either partially stored or not stored at all in a disk-based cache, initiate a tape reading session corresponding to the file;
   allocate a buffer in memory for the tape reading, wherein the buffer is a circular buffer;
   during the tape reading session:
      store file data in the buffer read from an LTFS volume;
      restore the file to the disk-based cache from the buffer;
      reply to read requests for file data of the file from non-lagging network file system interface clients associated with the tape reading session from the buffer; and
      reply to read requests for file data of the file from lagging network file system interface clients from the disk-based cache, wherein a network file system interface client was determined to be a lagging network file system interface client based on a position in the circular buffer associated with the network file system client at risk of being overwritten, the risk of being overwritten determined by a space in the circular buffer between a producer writing data in the circular buffer and the position in the circular buffer associated with the network file system interface client.

9. The computer program product of claim 8, wherein the tape reading session comprises:
   a tape data producer configured to write file data into the buffer;
   one or more consumers configured to read data from the buffer:
   wherein the set of computer program instructions further comprise instructions executable to expel lagging consumers from the tape reading session.

10. The computer program product of claim 9, wherein the set of computer program instructions are further comprise instructions executable to determine that a consumer is lagging if a data available size for that consumer equals a buffer size of the circular buffer.

11. The computer program product of claim 9, wherein the set of computer program instructions further comprise instructions executable to:
   maintain an absolute producer index and virtual producer index;
   maintain an absolute consumer index for each of the one or more consumers and a virtual consumer index for each of the one or more consumers; and
   for a consumer, delete the absolute consumer index and virtual consumer index for that consumer if that consumer is expelled from the tape reading session.

12. The computer program product of claim 8, wherein the set of computer program instructions further comprise instructions executable to map linear file positions to positions in the buffer.

13. The computer program product of claim 9, wherein the one or more consumers comprise a file restoration consumer and one or more client consumers.

14. The computer program product of claim 13, wherein the set of computer program instructions further comprise instructions executable to add a client consumer to the tape reading session for each network file system interface client from which an "open" command is received for the file within a defined portion of the tape reading session.

15. A method for reading file data from a tape file comprising:
   interfacing with a media library having tapes storing files according to a tape file system;
   maintaining a read cache of files in a data store, the read cache containing file stubs of files in the media library;
   presenting a network file system interface to clients;
   for a request for a file having a file stub in the read cache,
      initiating a tape reading session corresponding to the file;
      allocating a buffer in memory for the tape reading session, wherein the buffer is a circular buffer;
      during the tape reading session:
         storing file data for the file in the buffer read from a tape file system volume;
         restoring the file to the data store from the buffer;
      replying to read requests for file data of the file from the buffer for read requests from non-lagging network file system interface clients associated with the tape reading session; and
      replying to read requests for file data of the file from the data store from lagging network file system interface clients, wherein a network file system interface client was determined to be a lagging network file system interface client based on a position in the circular buffer associated with the network file system client at risk of being overwritten, the risk of being overwritten determined by a space in the circular buffer between a producer writing data in the circular buffer and the position in the circular buffer associated with the network file system interface client.

16. The method of claim 15, wherein:
   the tape reading session comprises:
      a tape data producer configured to write file data into the buffer;
      one or more consumers configured to read data from the buffer; and
   the method further comprises expelling lagging consumers from the tape reading session.

17. The method of claim 16, further comprising determining that a consumer is lagging if a data available size for that consumer equals a buffer size of the circular buffer.

18. The method of claim 16, further comprising:
   maintaining an absolute producer index and virtual producer index;
   maintaining an absolute consumer index for each of the one or more consumers and a virtual consumer index for each of the one or more consumers; and
   for a consumer, deleting the absolute consumer index and virtual consumer index for that consumer if that consumer is expelled from the tape reading session.

19. The method of claim 18, further comprising mapping linear file positions to positions in the buffer.

20. The method of claim 16, wherein the one or more consumers comprise a file restoration consumer and one or more client consumers.

21. The method of claim 20, further comprising adding a client consumer to the tape reading session for each network file system interface client from which an "open" command is received for the file within a defined portion of the tape reading session.

* * * * *